United States Patent [19]

Hoshi et al.

[11] Patent Number: 5,646,291

[45] Date of Patent: Jul. 8, 1997

[54] PROCESS FOR THE MANUFACTURE OF 2-PHENYL-4,5-OXAZOLEDIONE 4-PHENYLHYDRAZONE DERIVATIVES

[75] Inventors: Hajime Hoshi, Fukushima; Kazuhiko Sunagawa, Iwaki; Takeo Watanabe, Fukushima, all of Japan

[73] Assignee: Kureha Chemical Industry Co., Ltd., Tokyo, Japan

[21] Appl. No.: 431,573

[22] Filed: May 1, 1995

Related U.S. Application Data

[63] Continuation-in-part of Ser. No. 88,914, Jul. 8, 1993, abandoned, which is a continuation of Ser. No. 814,097, Dec. 26, 1991, abandoned.

[30] Foreign Application Priority Data

Dec. 27, 1990 [JP] Japan ................... 2-414631
Sep. 5, 1991 [JP] Japan ................... 3-254846

[51] Int. Cl.$^6$ ............................................. C07D 263/18
[52] U.S. Cl. ............................................. 548/228
[58] Field of Search ........................... 548/228, 266.8

[56] References Cited

U.S. PATENT DOCUMENTS

| | | | |
|---|---|---|---|
| Re. 33,132 | 12/1989 | Aoki et al. | 548/228 |
| 4,795,484 | 3/1989 | Aoki et al. | 548/262 |
| 4,820,334 | 4/1989 | Shida et al. | 548/228 |
| 4,919,707 | 4/1990 | Shida et al. | 548/266.8 |
| 4,973,353 | 11/1990 | Shida et al. | 548/266.8 |
| 5,001,275 | 3/1991 | Shida et al. | 568/583 |
| 5,094,684 | 3/1992 | Shida et al. | 548/266.8 |
| 5,155,015 | 10/1992 | Jimbo | 548/228 |
| 5,453,508 | 9/1995 | Knapp | 548/228 |

FOREIGN PATENT DOCUMENTS

| | | |
|---|---|---|
| 297734 | 1/1989 | European Pat. Off. |
| 58-185572 | 10/1983 | Japan . |
| 58-194866 | 12/1983 | Japan . |
| 59-98004 | 6/1984 | Japan . |

OTHER PUBLICATIONS

Sawdey, Jour Am Chem. Soc. vol. 79, pp. 1955–1956 (1957).
Curran, Jour Am Chem Soc vol. 102, pp. 6828–6837 (1980).
Khalifa et al., Heterocycles vol. 20 (1) pp. 45–49 (1983).

*Primary Examiner*—Donald G. Daus
*Attorney, Agent, or Firm*—Burgess, Ryan & Wayne

[57] ABSTRACT

A process for manufacturing derivatives of 2-phenyl-4,5-oxazoledione 4-phenylhyrazone is disclosed. The process comprises reacting a derivative of a benezenediazonium salt, a hippuric acid derivative, and acetic anhydride in the presence of a neutralizing agent to effect the cyclization reaction for the formation of the oxazolone ring and the succeeding diazo-coupling reaction. The process does not require the conventional separate, independent step for the preparation of a solution of a hippuric acid derivative and acetic anhydride, thus eliminating the quick heating and quenching procedures and further avoiding the loss of the hippuric acid derivative due to decomposition of the oxazolone derivative. There is thus obtained a high yield of the desired product in a short period of time.

13 Claims, No Drawings

PROCESS FOR THE MANUFACTURE OF 2-PHENYL-4,5-OXAZOLEDIONE 4-PHENYLHYDRAZONE DERIVATIVES

RELATED APPLICATIONS

This application is a continuation-in-part of Ser. No. 08/088,914, filed Jul. 8, 1993 abandoned, which is a continuation of Ser. No. 07/814,097, filed Dec. 26, 1991, now abandoned.

BACKGROUND OF THE INVENTION

The present invention relates to a process for the manufacture of 2-phenyl-4,5-oxazoledione 4-phenylhydrazone derivatives of formula (III), indicated below, which are useful as dyestuffs and also as intermediates of agrichemicals and pharmaceuticals As shown in the below reaction scheme, 2-phenyl-4,5-oxazoledione 4-phenylhydrazone derivatives of the formula (III) are converted into triazole compounds of formula (IV) containing amide, acid, ester and ketone via reaction with nucleophilic reagent Nu—H, (referred to *J. Am. Chem. Soc.*,79, 1955–1956(1957), Heterocycle,20, 45–49(1983) and U.S. Pat. No. 4,795,484).

reaction scheme

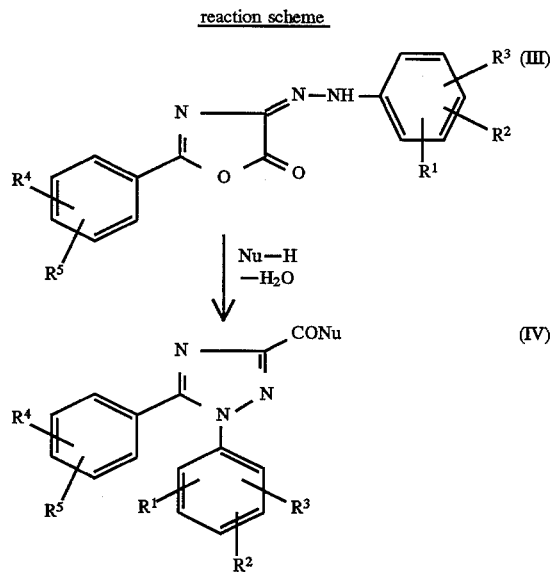

wherein $R^1$ is hydrogen, halogen, lower alkyl, lower alkoxy, lower alkylthio, lower alkoxycarbonyl, lower alkyl substituted with one or more halogen(s), cyano, nitro or $AOCH_2$;

A is hydrogen, unsubstituted or substituted alkyl, unsubstituted or substituted alkenyl, unsubstituted or substituted cycloalkylalkyl, unsubstituted or substituted aryl, unsubstituted or substituted aralkyl, $R^2$ is hydrogen, halogen or lower alkyl;
$R^3$ is hydrogen, halogen or lower alkyl;
$R^2$ and $R^3$ are the same or different;
$R^4$ is hydrogen, halogen, lower alkyl, lower alkoxy, nitro, lower alkyl substituted with one or more halogen(s) or $A'OCH_2$;
A' is alkyl substituted with one or more fluoro;
$R^5$ is hydrogen, halogen, lower alkyl or lower alkoxy;
Nu—H (or Nu—) means so-called nucleophilic reagent including $NH_3$, primary amine, secondary amine, hydroxy ion, alkoxy ion, hydrazine, hydroxyamine, carbanion from active methylene compound and the like.

U.S. Pat. Re 33,132 discloses a trizole carboxyamide of formula (A), preparation process thereof and herbicidal compositions.

Formula (A)

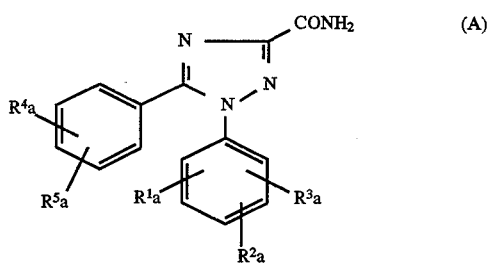

wherein $R^1a$ is $C_1$–$C_3$ alkyl, chloro, fluoro, iodo, trifluoromethyl or nitro
$R^2a$ is hydrogen, methyl or chloro;
$R^3a$ is hydrogen or methyl;
$R^4a$ is hydrogen;
$R^5a$ is hydrogen.

U.S. Pat. No. 4,795,484 (corresponding to JP 185572 (1983) and JP 98004(1984)) discloses a triazole carboxamide of formula (B), preparation process thereof and herbicidal compositions.

Formula (B)

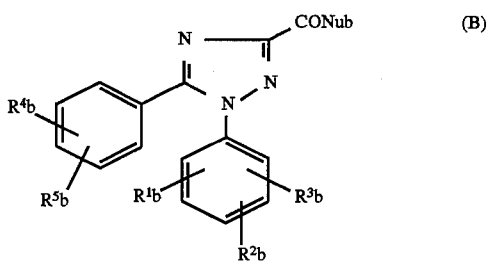

(wherein $R^1b$ is hydrogen, halogen, $C_1$–$C_2$ alkyl, fluoromethyl, 3,3,3-trifluoropropyl, methoxy, cyano, methoxymethyl, methylthio, methoxycarbonyl or (1-methylethyloxy)carbonyl;
$R^2b$ is hydrogen, halogen, $C_1$–$C_2$ alkyl;
$R^3b$ is hydrogen;
$R^4b$ is hydrogen;
$R^5b$ is hydrogen;
Nub is aminocarbonyl, hydrazinocarbonyl, hydroxyaminocarbonyl, methoxyaminocarbonyl and the like.

JP 98004(1984) (corresponding to post-examination publication JP 60824(1991)) which is incorporated herein by reference discloses a triazole carboxamide of formula (C), preparation process thereof and herbicidal compositions.

Formula (C)

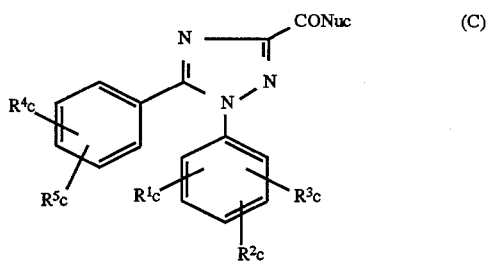

(wherein $R^1c$ is hydrogen, halogen, $C_1$–$C_4$ alkyl, halogeno ($C_1$–$C_4$) alkyl, methoxy, methoxymethyl, methylthio, cyano or (C1–C4 alkoxy)carbonyl;

$R^2c$ is hydrogen, halogen or $C_1$–$C_4$ alkyl;

$R^3c$ is hydrogen;

$R^4c$ is hydrogen, $C_1$–$C_4$ alkyl, halogen or halogeno ($C_1$–$C_4$) alkyl;

$R^5c$ is hydrogen;

Nuc is aminocarbonyl, hydrazinocarbonyl, hydroxyaminocarbonyl, methoxyaminocarbonyl and the like.) JP 98004 is the publication number of Japanese application number 57-206486 which is a priority document upon which U.S. Pat. No. 4,795,484 is based. U.S. Pat. No. 4,795,484 discloses a herbicidal composition comprising a derivative of 1,2,4-triazole as an active ingredient, represented by the general formula (I):

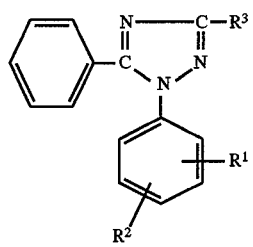

wherein $R^1$ represents a hydrogen atom, a halogen atom or a ($C_1$–$C_2$) alkyl group; $R^2$ represents a hydrogen atom, a halogen atom, a ($C_1$–$C_2$) alkyl group, fluoromethyl-methyl group (—CH$_2$F), 3,3,3-trifluoropropyl group, methoxy group, cyano group, methoxymethyl group, methylthio group, methoxycarbonyl group or isopropoxycarbonyl group and $R^3$ represents a thiocarbamoyl group or a group represented by the formula (II):

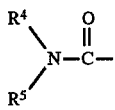

wherein $R^4$ represents a hydrogen atom, a ($C_1$–$C_2$) alkyl group or a hydroxy ($C_1$–$C_2$) alkyl group and $R^5$ represents a hydrogen atom, a ($C_1$–$C_2$) alkyl group, halogeno ($C_1$–$C_2$) alkyl group, hydroxy ($C_1$–$C_2$) alkyl group, cyanomethyl group, acetyl group, halogenoacetyl group, methoxyacetyl group, amino group, phenyl group, methoxy group, hydroxyl group, ($C_2$–$C_3$) alkenyl group, halogeno ($C_2$–$C_3$) alkenyl group, isopropyl-carbonyl group, methylthiocarbamoyl group or 2-methoxyethyl group, with the proviso that $R^2$ is not a hydrogen atom, halogen atom or ($C_1$–$C_2$) alkyl group when both of $R^4$ and $R^5$ represent hydrogen atoms, and herbicidally acceptable carrier(s) or diluent(s).

The inventors of U.S. Pat. No. 4,795,484 sought a compound showing excellent activity in selectively controlling weeds such as Echinochloa crus-galli, Poa annua, Chenopodium album, Cardamine flexuosa, Portulaca orelacea, etc. Without any phytotoxicity to crop plants such as rice, wheat and maize, and as a result, they have found that a derivative of 1,2,4-triazole represented by the formula (I) shows an excellent herbicidal activity for practically controlling the weeds.

U.S. Pat. No. 4,820,334 discloses a triazole carboxamide of formula (D), preparation process thereof and herbicidal compositions.

Formula (D)

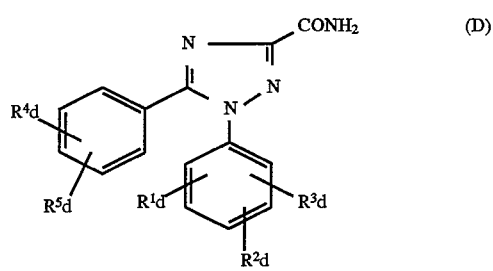

(wherein $R^1$d is 3-AdOCH.

Ad is hydrogen, straight or branched saturated ($C_2$–$C_{10}$) alkyl which is unsubstituted or fluoro(s) substituted;

cyclic saturated ($C_3$–$C_{10}$) alkyl which is unsubstituted or fluoro(s) substituted;

straight, branched or cyclic unsaturated ($C_3$–$C_{10}$) alkyl which is unsubstituted or fluoro (s) substituted;

a group of formula (D1), wherein $R^6$d is halogen, $C_1$–$C_3$ alkyl, $C_1$–$C_3$ alkoxy or fluoro ($C_1$–$C_3$) alkyl, m is an integer of 0–5 and n is 0 or 1;

Formula (D1)

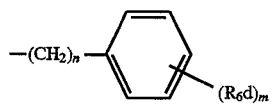

straight or branched saturated ($C_1$–$C_8$) alkoxy ($C_2$–$C_{10}$) alkyl; straight or branched unsaturated ($C_1$–$C_8$) alkoxy ($C_2$–$C_{10}$) alkyl; phenoxy ($C_2$–$C_6$) alkyl; aralkoxy ($C_2$–$C_6$) alkyl;

phenoxy ($C_2$–$C_6$) alkyl having phenyl(s) substituted halogen(s) or $C_1$–$C_3$ alkyl(s);

aralkoxy ($C_3$–$C_6$) alkyl having phenyl(s) substituted halogen(s) or $C_1$–$C_3$ alkyl(s);

($C_1$–$C_8$) alkoxy ($C_2$–$C_{10}$) alkoxy ($C_2$–$C_{10}$) alkyl; or a group of formula (D2), wherein p is an integer of 1–8;

Formula (D2)

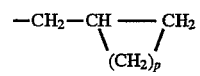

$R^2d$ is hydrogen;

$R^3d$ is hydrogen;

$R^4d$ is hydrogen;

$R^5d$ is hydrogen.

U.S. Pat. No. 4,919,707 discloses a triazole carboxamide of formula (E), preparation process thereof and herbicidal compositions.

Formula (E)

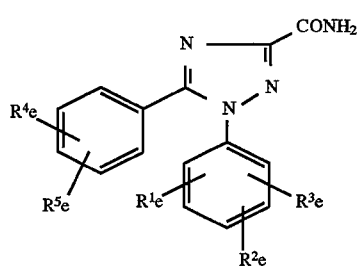

wherein $R^1e$ is 3-AeOCH$_2$;

$A^e$ is straight ($C_2$–$C_{10}$) alkyl, branched ($C_3$–$C_{10}$) alkyl, $C_3$–$C_{10}$ cycloalkyl, ($C_4$–$C_{10}$) cycloalkylalkyl, unsubstituted or halo substituted phenyl, $C_7$–$C_9$ aralkyl, ($C_3$–$C_6$) alkenyl, $F_1$–$F_{19}$ substituted ($C_2$–$C_{10}$) alkyl;

$R^2e$ is hydrogen;

$R^3e$ is hydrogen;

$R^4e$ is fluoro, chloro, methyl or methoxy;

$R^3e$ is hydrogen.

U.S. Pat. No. 4,973,353 discloses a triazole carboxamide of formula (F), preparation process thereof and herbicidal compositions.

Formula (F)

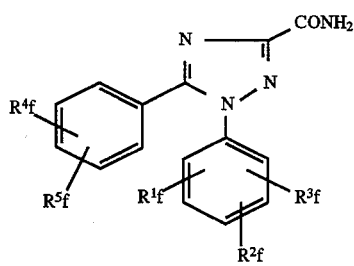

wherein $R^1$ is 3-AfOCH$_2$;

Af is unsubstituted or $F_1$–$F_{19}$ substituted straight ($C_1$–$C_{10}$) alkyl, unsubstituted or $F_1$–$F19$ substituted branched ($C_3$–$C_{10}$) alkyl, ($C_3$–$C_{10}$) cycloalkyl, ($C_3$–$C_7$) cycloalkyl ($C_1$–$C_3$) alkyl, phenyl or $C_7C_9$ aralkyl;

$R^2f$ is halogen or $C_1$–$C_3$ alkyl;

$R^3f$ is hydrogen, halogen or $C_1$–$C_3$ alkyl;

$R^4f$ is hydrogen or fluoro;

$R^5f$ is hydrogen or fluoro.

U.S. Pat. No. 5,001,275 discloses a triazole carboxamide of formula (G), preparation process thereof and herbicidal compositions.

Formula (G)

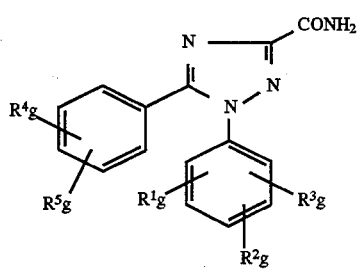

wherein $R^1g$ is 3-AgOCH$_2$; Ag is branched ($C_4$–$C_8$) alkyl, ($C_4$–$C_8$) cycloalkyl, ($C_3$–$C_7$) cycloalkyl ($C_1$–$C_3$) alkyl, $C_7$–$C_9$ aralkyl, ($C_1$–$C_4$) alkoxy ($C_2$–$C_4$) alkyl, unsaturated ($C_3$–$C_6$) alkyl, $F_1$–$F_{15}$ substituted straight ($C_2$–$C_8$) alkyl, $F_1$–$F_{15}$ substituted branched ($C_3$–$C_8$) alkyl, $R^2g$ is hydrogen;

$R^3g$ is hydrogen;

$R^4g$ is hydrogen;

$R^5g$ is hydrogen.

U.S. Pat. No. 5,094,684 (corresponding to EP 297734) discloses a triazole carboxamide of formula (H), preparation process thereof and herbicidal compositions.

Formula (H)

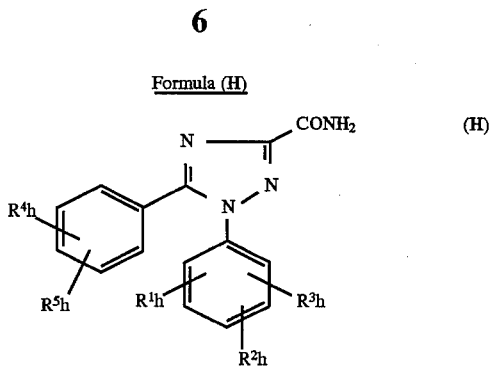

wherein $R^1h$ is hydrogen or fluoro;

$R^2h$ is hydrogen;

$R^3h$ is hydrogen;

$R^4h$ is 3-A'hOCH$_2$;

A'h is fluoro(s) substituted $C_2$–$C_{10}$) alkyl;

$R^5h$ is hydrogen.

JP 58-185572; *Chem. Abstr.*, 100, 156607X(1984) which is incorporated herein by reference discloses a triazole carboxamide of formula (Ii), preparation process thereof and herbicidal compositions.

Formula (Ii)

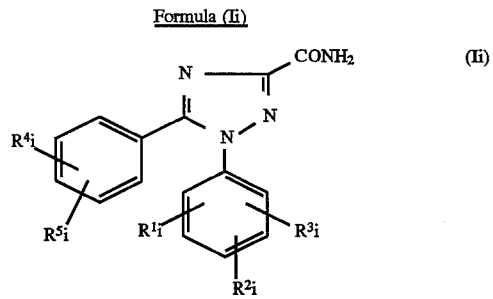

wherein $R^1i$ is hydrogen or alkyl;

$R^2i$ is hydrogen or the same as $R^1i$;

$R^3i$ is hydrogen;

$R^4i$ is alkyl, alkoxy, nitro or halogen;

$R^5i$ is hydrogen or the same as $R^4i$.

The aforementioned *Chemical Abstracts* reference discloses compounds of the formula

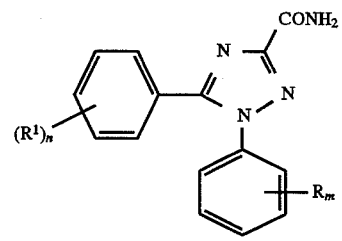

wherein R is hydrogen or alkyl; $R^1$ is alkyl or alkoxy, m=0–2 and n=1–2. The compounds of formula I of the reference were shown to have herbicidal activity against Echochloa crus-galli, Chenopodium album, Portulaca oleracea, and the like.

EP 346620 which is incorporated herein by reference discloses a triazole compound of formula (J), preparation process thereof and safener compositions for herbicide.

Formula (J)

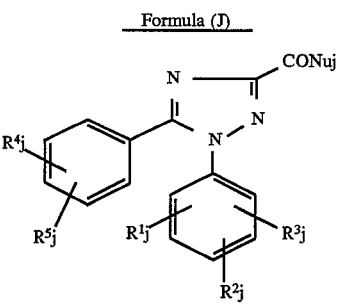

wherein $R^1j$ is hydrogen, halogen, nitro, cyano,
optionally halo substituted ($C_1$–$C_4$) alkyl,
optionally halo substituted ($C_1$–$C_4$) alkoxy,
optionally halo substituted ($C_1$–$C_4$) alkylthio,
optionally ($C_1$–$C_4$) alkyl substituted ($C_3$–$C_6$) cycloalkyl, hydroxymethyl,
optionally ($C_1$–$C_4$) alkyl substituted ($C_1$–$C_4$ alkoxy) methyl,
optionally one or more halogeno(s) and/or trifluoromethyl substituted phenyl and the like;

$R^2j$ is hydrogen or the same as $R^1j$;

$R^3j$ is hydrogen or the same as $R^1j$;

$R^4j$ is hydrogen, halogen, nitro, cyano,
optionally halo substituted ($C_1$–$C_4$) alkyl,
optionally halo substituted ($C_1$–$C_4$) alkoxy,
optionally halo substituted ($C_1$–$C_4$) alkylthio,
optionally ($C_1$–$C_4$) alkyl substituted ($C_3$–$C_6$) cycloalkyl, hydroxymethyl,
optionally ($C_1$–$C_4$) alkyl substituted ($C_1$–$C_4$ alkoxy) methyl, optionally one or more halogeno(s) and/or trifluoromethyl substituted phenyl and the like;

$R^5j$ is hydrogen or the same as $R^4j$;

Nuj is hydroxy, $C_1$–$C_4$ alkoxy and the like.

EP 346 620 further discloses 1,2,4-triazole derivatives of the formula:

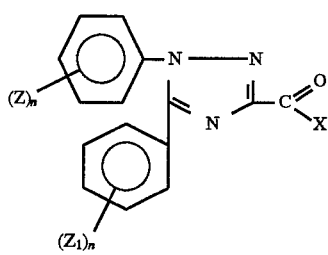

wherein Z or $Z_1$ are halogen, nitro, cyano, or an amino, alkyl, alkoxy, alkylthio, cycloalkyl, phenyl, or phenoxy, and X is hydroxy, —$OCH_2Si(CH)_3$, alkyl, cycloalkoxy, phenoxy, alkenyloxy, alkynyloxy, substituted alkoxy, or substituted alkylthio. The compounds are indicated to be useful as safeners for herbicides.

U.S. Pat. No. 4,820,334 and EP 346620 do not use 2-phenyl-4,5-oxazoledione 4-phenylhydrazone derivatives as precursors. But, the triazole carboxamide of formula (D) and the triazole compound of formula (J) can be also prepared via the reaction of the corresponding 2-phenyl-4,5-oxazoledione 4-phenylhydrazone derivatives and nucleophilic reagents. (referred to *J. Am. Chem. Soc.,* 79, 1955–1956(1957) and *Heterocycle,* 20, 45–49(1983)).

Prior to the present invention, it had been thought that 2-phenyl-5(4H)-oxazolone derivatives were the precursors in the step of diazo coupling for preparation of 2-phenyl-4,5-oxazoledione 4-phenylhydrazone derivatives, and 2-phenyl-5(4H)-oxazolone derivatives had to be prepared before use via rapidly heating of hippuric acids and acetic anhydride in the condition free from water and then rapidly cooling. Further, a person skilled in the art knows that 2-phenyl-5(4H)-oxazolone derivatives are unstable not only in the cyclocondensed mixture of hippuric acids and acetic anhydride but also in an aqueous acidic mixture (referred to *Org. Syn. Coll.,* 5, 946–948(1973) and *J. Am. Chem. Soc.,* 102, 6828–6837(1980)). For example, as shown in FIG. 2 on page 6830 of the above *JACS*(1980), half-life period of 2-(4-chlorophenyl)-5(4H)-oxazolone in pH 1-2 is about 7 seconds. Accordingly, it is unexpected that hippuric acids and acetic anhydride could be used in the step of diazo coupling instead of the freshly prepared 2-phenyl-5(4H)-oxazolone derivatives.

DESCRIPTION OF THE BACKGROUND ART

Conventional processes for the manufacture of 2-phenyl-4,5-oxazoledione 4-phenylhydrazone derivatives comprise the following 3 steps; (i) a step for preparing a derivative of benzenediazonium salt by the diazotization reaction of an aniline derivative, (ii) a step for preparing a derivative of 2-phenyl-5(4H)-oxazolone from a mixed solution of a hippuric acid derivative and acetic anhydride, and (iii) a step for manufacturing a hydrazone derivative by the diazo coupling reaction of the derivatives of benzenediazonium salt and the derivative of 2-phenyl-5(4H)-oxazolone. Typical processes are disclosed, for example, in EP-A-282303 (U.S. Pat. No. 4,973,353) and EP-310555. Reactions in these processes proceed as follows. Process of EP-A-282303 (U.S. Pat. No. 4,973,353)

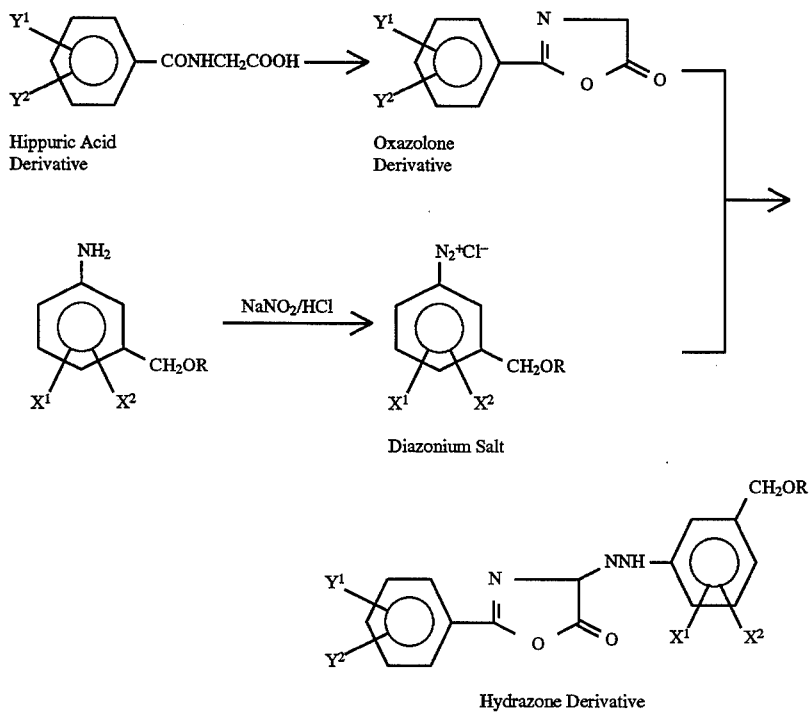

In the above process scheme, R represents a $C_1$–$C_{10}$ linear alkyl group which may be unsubstituted or substituted by fluorine, a $C_3$–$C_{10}$ branched alkyl group which may be Unsubstituted or substituted by fluorine, a cyclic alkyl group, an alkyl group with an alicyclic structure, a phenyl group, or a $C_7$–$C_9$ aralkyl group; $X^1$ is a halogen or a $C_1$–$C_3$ alkyl group; $X^2$ is a hydrogen, a halogen, or a $C_1$–$C_3$ alkyl group; $Y^1$ is a hydrogen or a fluorine; and $Y^2$ is a hydrogen or a fluorine.

Process of EP-A-310555

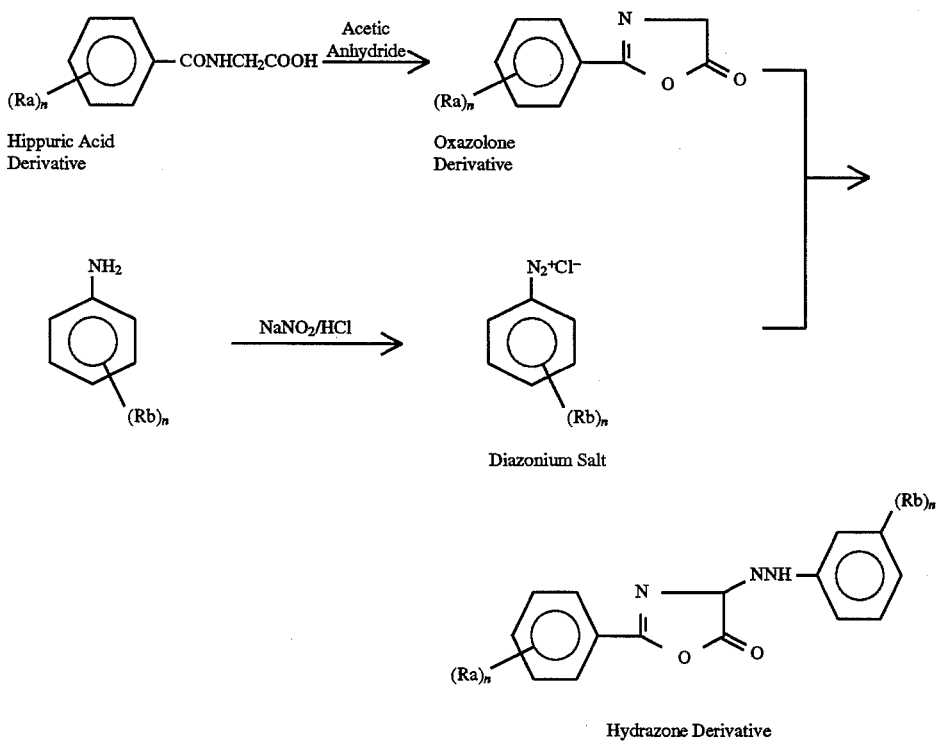

In the above process scheme, $R_a$ and $R_b$ each individually represents a halogen, a $C_1$–$C_5$ alkyl group, a $C_1$–$C_5$ haloalkyl group, a $C_2$–$C_5$ alkenyl group, a $C_2$–$C_5$ alkynyl group, a $C_1$–$C_5$ alkoxy group, a $C_1$–$C_5$ haloalkoxy group, a nitro group, or a cyano group; and n is an integer of 0–3.

Other prior art frequently referred to processes for the manufacture of 2-phenyl-4,5-oxazoledione 4-phenylhydrazone derivatives are *Chem. Abst.*, 45, 7565e (1951) and *J. Am. Chem. Soc.*, 79, 1955–1956 (1957). Regarding the step of preparing a solution of hippuric of hippuric acid and acetic anhydride, the former describes a procedure of rapidly quenching a hippuric acid solution in hot acetic anhydride, and the latter proposes heating hippuric acid in acetic anhydride until a transparent solution is obtained. Another prior art, *Org. Syn. Col.*, 5, 946–948 (1973), describes that hippuric acid is rapidly converted into 2-phenyl-5(4H)-oxazolone under these conditions.

As is apparent from the prior art, a step for the preparation of a solution of hippuric acid and acetic anhydride, i.e., a step for the production of an oxazolone derivative, has been considered to be indispensable for a manufacturing process of a 2-phenyl-4,5-oxazoledione 4-phenylhydrazone derivative.

In the step for preparing a solution of hippuric acid and acetic anhydride, which is independent from a step for preparing a derivative of diazonium salt in conventional processes, a heated solution of oxazolone derivative must be cooled to a temperature of the diazotization reaction mixture which contains a neutralized diazonium derivative. Since 2-phenyl-5(4H)-oxazolone, for example, is unstable in hot acetic anhydride (*Org. Syn. Coll.*, 5, 946–948 (1973), the shorter the time for the heating and cooling, the smaller is the amount of oxazolone derivatives which decompose in the reaction.

A longer period of time for cooling a heated solution containing oxazolone derivatives thus results in a decreased yield of 4-phenylhydrazone derivatives. The cooling procedure therefore must be carried out as quickly as possible in conventional processes. In a mass production of 4-phenylhydrazone derivatives, in which great amounts of chemicals are involved in the preparation of the solution of hippuric acid and acetic anhydride, the rapid heating and the quenching require complicated and difficult operations.

In view of these extremely complicated and difficult operations involved in the quenching of a solution of hippuric acid and acetic anhydride in the mass production of 2-phenyl-4,5-oxazoledione 4-phenylhydrazone derivatives, the present inventors have undertaken extensive studies in order to improve the step for preparing this solution. As a result, the inventors have found that a reaction of a benzenediazonium salt derivative, a hippuric acid derivative, and acetic anhydride in the presence of a neutralizing agent could avoid the above problems.

SUMMARY OF THE INVENTION

Accordingly, an object of the present invention is to provide a process for manufacturing a derivative of 2-phenyl-4,5-oxazoledione 4-phenylhydrazone which comprises reacting a derivative of benezenediazonium salt, a hippuric acid derivative, and acetic anhydride in the presence of a neutralizing agent.

In a preferred embodiment of the present invention, the neutralizing agent is one or more compounds selected from the group consisting of alkali metal salts of weak acids, alkaline earth metal salts of weak acids, zinc salt of weak acids, oxides of alkaline earth metals, zinc oxide, organic tertiary amines, pyridine and pyridine derivatives.

Other objects, features and advantages of the invention will hereinafter become more readily apparent from the following description.

DETAILED DESCRIPTION OF THE INVENTION AND PREFERRED EMBODIMENTS

Derivatives of benzenediazonium salts with any substituted groups on the benzene ring can be used in the process of the present invention so long as such substituted groups do not adversely affect the diazotization reaction of the aniline derivative which is a precursor of the derivative of the benezenediazonium salt. Also, any hippuric acid derivatives can be used so long as such derivatives are those with substituted groups on the benzene ring which do not interfere with the oxazolone cyclization reaction following said diazotization reaction and the succeeding diazo coupling reaction (such cyclization reactions and diazo coupling reactions are hereinafter collectively referred to as "cyclization-coupling reaction".)

The following is a preferred embodiment of the present invention:

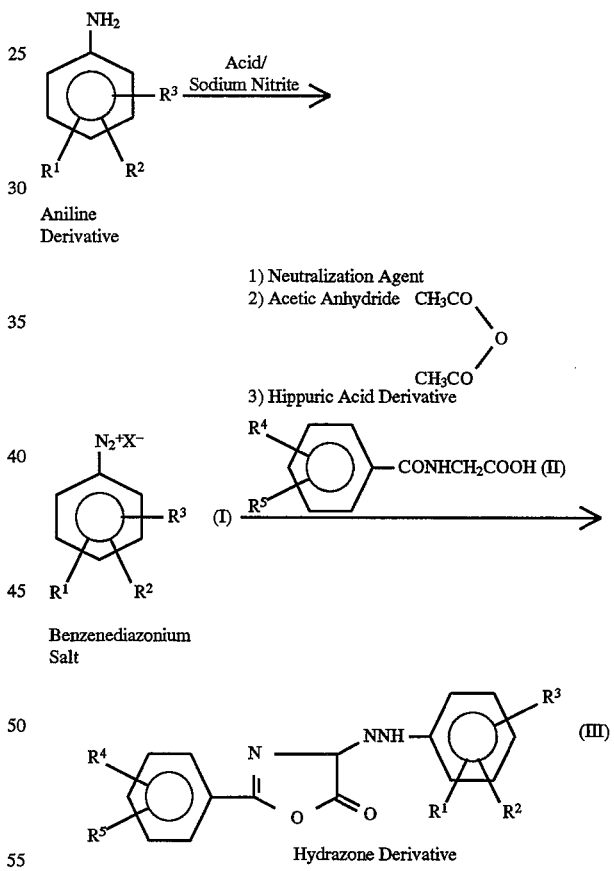

wherein $R^1$ is a hydrogen, a halogen, a lower alkyl group, a lower alkoxy group, a lower alkylthio group, a lower alkoxycarbonyl group, a lower alkyl group substituted with one or more halogen atoms, a cyano group, a nitro group, or a group $AOCH_2$, wherein A is a hydrogen, a substituted or unsubstituted alkyl, alkenyl, cycloalkylalkyl, aryl, or aralkyl group; $R^2$ and $R^3$, which may be the same or different, represent a hydrogen, a halogen or a lower alkyl group; X denotes an anion such as a chloride ion, sulfate ion, tetrafluoroborate ion, or the like; $R^4$ is a hydrogen, a halogen, a lower alkyl group, a lower alkoxy group, a lower alkyl group substituted with one or more halogen atoms, a nitro group or a group A'OCH$_2$, wherein A' is an alkyl group substituted with one or more fluorine atoms; and R$^5$ is a hydrogen, a halogen, a lower alkyl group, or a lower alkoxy group.

The substituent of "unsubstituted or substituted alkyl in A or R$^{1}$" includes fluoro, (C$_1$–C$_8$)alkoxy, (C$_3$–C$_8$) alkenyloxy, (C$_1$–C$_8$) alkoxy (C$_2$–C$_{10}$) alkoxy, unsubstituted or substituted phenoxy and unsubstituted aralkoxy.

The substituent of "unsubstituted or substituted aryl in A of R$_1$" includes fluoro, chloro, methyl, trifluoromethyl and methoxy.

The substituent of "unsubstituted or substituted aralkyl in A of R$^{1}$" includes fluoro, chloro, methyl and methoxy.

According to the above reaction scheme, to a derivative of the benzenediazonium salt represented by formula (I) which is a diazotization product of an aniline derivative, a neutralizing agent, acetic anhydride, and a derivative of hippuric acid of formula (II) are added to effect the cyclization-coupling reaction, thus producing 2-phenyl-4,5-oxazoledione 4-phenylhydrazone derivatives.

For the preparation of the salt of the benzenediazonium compound of formula (I), a mixture of an aniline derivative, an inorganic acid such as hydrochloric acid or sulfuric acid, or an organic acid such as acetic acid or propionic acid, are reacted, with stirring, while an aqueous solution of a nitrite such as sodium nitrite, is added dropwise to complete the diazotization of the aniline derivative. When a surplus amount of nitrite for the amount of aniline derivative is used, the addition of sulfamic acid or urea after completion of the diazotization is preferable for decomposing the unreacted nitrite.

The reaction mixture thus prepared is mixed with the hippuric acid derivative of formula (II) and acetic anhydride. In this instance, one or more inorganic or organic basic compounds are used as neutralizing agents for the benzenediazonium salt derivative. Such neutralizing agents are selected from alkali metal salts, alkaline earth metal salts, or zinc salts of weak acids, e.g., acetate, carboxylate; or alkaline earth metal oxides or zinc oxide, organic tertiary amines, e.g., triethylamine, ethyldiisopropylamine, tripropriamine, etc.; and pyridine derivatives, e.g. methylpyridine, dimethylpyridine, etc. Especially preferable among these neutralizing agents are alkali metal salts, alkaline earth metal salts or zinc salts of weak acids, e.g., acetate, carboxylate, or alkaline earth metal oxides or zinc oxide.

There are no restrictions to the manner of the neutralization. A method of neutralizing after mixing the benzenediazonium salt derivative (I), hippuric acid derivative (II), and acetic anhydride, a method of neutralizing benzenediazonium salt derivative (I) before the addition of hippuric acid derivative (II) and acetic anhydride; a method of mixing partially neutralized benezenediazonium salt derivative (I) with hippuric acid derivative (II) and acetic anhydride, followed by the neutralization of the remaining benzenediazonium salt derivative, and the like, are given as possible methods of the neutralization. A preferred amount of neutralization agents used is 1.1–2.0 equivalents to the amount of the benzenediazonium salt derivative.

For the control of the heat generated by the neutralization reaction, it is possible to remove heat by cooling, add the neutralization agent in portions and adjust the lump size of the neutralization agent. The hydrazone derivative of formula (III) can be obtained in a good yield by controlling the reaction temperature below 20° C., preferably below 15° C. and especially preferably, below 10° C. up to this point. Unexpectedly, heating a hippuric acid derivative and acetic anhydride is unnecessary.

Thereafter, the reaction temperature is raised to 20°–35° C. to further promote the cyclization-coupling reaction to obtain the desired hydrazone derivative. Reaction time exceeding 16 hours does not result in a better yield of the product.

Examples of hydrazone derivatives manufactured by the process of the present invention are listed in the following tables.

TABLE 1

| Compound No. | R$^1$ | R$^2$ | R$^3$ | R$^4$ | R$^5$ |
|---|---|---|---|---|---|
| 1 | 3-CF$_3$ | 4-Cl | H | H | H |
| 2 | 3-CF$_3$ | H | H | H | H |
| 3 | 3-CF$_3$CH$_2$CH$_2$ | H | H | H | H |
| 4 | 3-n-C$_3$H$_7$ | H | H | H | H |
| 5 | 4-n-C$_3$H$_7$ | H | H | H | H |
| 6 | 3-C$_2$H$_5$ | H | H | H | H |
| 7 | 4-C$_2$H$_5$ | H | H | H | H |
| 8 | 3-CH$_2$F | H | H | H | H |
| 9 | 3-(cyclopropyl)CH$_2$OCH$_2$ | H | H | H | H |
| 10 | 3-(cyclopentyl)CH$_2$OCH$_2$ | H | H | H | H |
| 11 | 3-(cyclohexyl)CH$_2$OCH$_2$ | 4-Cl | H | H | H |
| 12 | 3-(cyclohexyl)CH$_2$OCH$_2$ | H | H | 2-F | H |
| 13 | 3-(cyclohexyl)CH$_2$OCH$_2$ | H | H | H | H |
| 14 | 3-neo-C$_5$H$_{11}$OCH$_2$ | 4-Cl | H | H | H |
| 15 | 3-neo-C$_5$H$_{11}$OCH$_2$ | H | H | 2-F | H |
| 16 | 3-neo-C$_5$H$_{11}$OCH$_2$ | H | H | H | H |
| 17 | 3-n-C$_7$F$_{15}$CH$_2$OCH$_2$ | H | H | H | H |
| 18 | 3-n-CHF$_2$(CF$_2$)$_5$CH$_2$OCH$_2$ | H | H | 2-F | H |
| 19 | 3-n-CHF$_2$(CF$_2$)$_5$CH$_2$OCH$_2$ | H | H | H | H |
| 20 | 3-n-CHF$_2$(CF$_2$)$_3$CH$_2$OCH$_2$ | H | H | 2-F | H |
| 21 | 3-n-CHF$_2$(CF$_2$)$_3$CH$_2$OCH$_2$ | H | H | H | H |
| 22 | 3-n-C$_3$F$_7$CH$_2$OCH$_2$ | 4-Br | H | H | H |

TABLE 2

| Compound No. | R$^1$ | R$^2$ | R$^3$ | R$^4$ | R$^5$ |
|---|---|---|---|---|---|
| 23 | 3-n-C$_3$F$_7$CH$_2$OCH$_2$ | 4-CH$_3$ | H | H | H |
| 24 | 3-n-C$_3$F$_7$CH$_2$OCH$_2$ | 4-Cl | H | H | H |
| 25 | 3-n-C$_3$F$_7$CH$_2$OCH$_2$ | H | H | 4-CH$_3$ | H |
| 26 | 3-n-C$_3$F$_7$CH$_2$OCH$_2$ | H | H | 4-Cl | H |
| 27 | 3-n-C$_3$F$_7$CH$_2$OCH$_2$ | H | H | 2-F | H |
| 28 | 3-n-C$_3$F$_7$CH$_2$OCH$_2$ | H | H | 3-F | H |
| 29 | 3-n-C$_3$F$_7$CH$_2$OCH$_2$ | H | H | 4-F | H |
| 30 | 3-n-C$_3$F$_7$CH$_2$OCH$_2$ | H | H | H | H |
| 31 | 3-n-C$_3$F$_7$CH$_2$OCH$_2$ | H | H | 4-CH$_3$O | H |
| 32 | 3-C$_2$F$_5$CH$_2$OCH$_2$ | 4-Br | H | H | H |
| 33 | 3-C$_2$F$_5$CH$_2$OCH$_2$ | 4-C$_2$H$_5$ | H | H | H |
| 34 | 3-C$_2$F$_5$CH$_2$OCH$_2$ | 4-CH$_3$ | H | 2-F | H |
| 35 | 3-C$_2$F$_5$CH$_2$OCH$_2$ | 4-CH$_3$ | H | 2-F | 6-F |
| 36 | 3-CHF$_2$CF$_2$CH$_2$OCH$_2$ | 4-CH$_3$ | H | H | H |
| 37 | 3-C$_2$F$_5$CH$_2$OCH$_2$ | 4-CH$_3$ | H | H | H |
| 38 | 3-C$_2$F$_5$CH$_2$OCH$_2$ | 2-Cl | H | H | H |
| 39 | 3-C$_2$F$_5$CH$_2$OCH$_2$ | 4-Cl | N | 2-F | H |
| 40 | 3-C$_2$F$_5$CH$_2$OCH$_2$ | 4-Cl | 6-Cl | H | H |

TABLE 2-continued

| Compound No. | R¹ | R² | R³ | R⁴ | R⁵ |
|---|---|---|---|---|---|
| 41 | 3-C₂F₅CH₂OCH₂ | 4-Cl | 6-F | H | H |
| 42 | 3-C₂F₅CH₂OCH₂ | 4-Cl | H | H | H |
| 43 | 3-C₂F₅CH₂OCH₂ | 6-Cl | H | H | H |
| 44 | 3-C₂F₅CH₂OCH₂ | 4-F | H | H | H |
| 45 | 3-C₂F₅CH₂OCH₂ | H | H | 4-CH₃ | H |
| 46 | 3-C₂F₅CH₂OCH₂ | H | H | 4-Cl | H |
| 47 | 3-C₂F₅CH₂OCH₂ | H | H | 2-F | H |

TABLE 3

| Compound No. | R¹ | R² | R³ | R⁴ | R⁵ |
|---|---|---|---|---|---|
| 48 | 3-C₂F₅CH₂OCH₂ | H | H | 3-F | H |
| 49 | 3-C₂F₅CH₂OCH₂ | H | H | 4-F | H |
| 50 | 3-C₂F₅CH₂OCH₂ | H | H | H | H |
| 51 | 3-C₂F₅CH₂OCH₂ | 4-I | H | H | H |
| 52 | 3-CHF₂CF₂CH₂OCH₂ | 4-Cl | H | H | H |
| 53 | 3-CHF₂CF₂CH₂OCH₂ | H | H | 2-F | H |
| 54 | 3-CHF₂CF₂CH₂OCH₂ | H | H | H | H |
| 55 | 3-CF₃CHFCF₂CH₂OCH₂ | 4-CH₃ | H | H | H |
| 56 | 3-CF₃CHFCF₂CH₂OCH₂ | 4-Cl | H | H | H |
| 57 | 3-CF₃CHFCF₂CH₂OCH₂ | H | H | 2-F | H |
| 58 | 3-CF₃CHFCF₂CH₂OCH₂ | H | H | H | H |
| 59 | 3-CF₃CH₂OCH₂ | 4-Br | H | H | H |
| 60 | 3-CF₃CH₂OCH₂ | 4-CH₃ | H | H | H |
| 61 | 3-CF₃CH₂OCH₂ | 4-Cl | H | H | H |
| 62 | 3-CF₃CH₂OCH₂ | H | H | 2-F | H |
| 63 | 3-CF₃CH₂OCH₂ | H | H | H | H |
| 64 | 3-n-C₁₀H₂₁OCH₂ | H | H | H | H |
| 65 | 3-n-C₈H₁₇OCH₂ | 4-Cl | H | H | H |
| 66 | 3-n-C₈H₁₇OCH₂ | H | H | H | H |
| 67 | 3-n-C₆H₁₃OCH₂ | 4-CH₃ | H | H | H |
| 68 | 3-n-C₆H₁₃OCH₂ | 4-Cl | H | H | H |
| 69 | 3-n-C₆H₁₃OCH₂ | H | H | 2-F | H |
| 70 | 3-n-C₅H₁₁OCH₂ | 4-Cl | H | H | H |
| 71 | 3-n-C₅H₁₁OCH₂ | H | H | 2-F | H |
| 72 | 3-n-C₅H₁₁OCH₂ | H | H | H | H |

TABLE 4

| Compound No. | R¹ | R² | R³ | R⁴ | R⁵ |
|---|---|---|---|---|---|
| 73 | 3-n-C₇H₁₅OCH₂ | H | H | H | H |
| 74 | 3-n-C₄H₉OCH₂ | 4-Br | H | 2-F | H |
| 75 | 3-n-C₄H₉OCH₂ | 4-Br | H | H | H |
| 76 | 3-n-C₄H₉OCH₂ | 4-CH₃ | H | H | H |
| 77 | 3-n-C₄H₉OCH₂ | 4-Cl | H | 2-F | H |
| 78 | 3-n-C₄H₉OCH₂ | 4-Cl | H | H | H |
| 79 | 3-n-C₄H₉OCH₂ | H | H | 2-F | H |
| 80 | 3-n-C₆H₁₃OCH₂ | H | H | H | H |
| 81 | 3-n-C₄H₉OCH₂ | H | H | H | H |
| 82 | 3-n-C₃H₇OCH₂ | 4-CH₃ | H | H | H |
| 83 | 3-n-C₃H₇OCH₂ | H | H | H | H |
| 84 | 3-iso-C₅H₁₁OCH₂ | 4-Br | H | H | H |
| 85 | 3-iso-C₅H₁₁OCH₂ | 4-CH₃ | H | 2-F | H |
| 86 | 3-iso-C₅H₁₁OCH₂ | 4-CH₃ | H | 2-F | 6-F |
| 87 | 3-iso-C₅H₁₁OCH₂ | 4-CH₃ | H | H | H |
| 88 | 3-iso-C₅H₁₁OCH₂ | 4-Cl | H | 2-F | 6-F |
| 89 | 3-iso-C₅H₁₁OCH₂ | 4-Cl | H | 2-F | 4-F |
| 90 | 3-iso-C₅H₁₁OCH₂ | 4-Cl | H | 2-F | H |
| 91 | 3-iso-C₅H₁₁OCH₂ | 4-Cl | H | H | H |
| 92 | 3-iso-C₅H₁₁OCH₂ | 4-Cl | 6-Cl | H | H |
| 93 | 3-iso-C₅H₁₁OCH₂ | H | H | 4-CH₃ | H |
| 94 | 3-iso-C₅H₁₁OCH₂ | H | H | 4-Cl | H |
| 95 | 3-iso-C₅H₁₁OCH₂ | H | H | 2-F | H |
| 96 | 3-iso-C₅H₁₁OCH₂ | H | H | 3-F | H |
| 97 | 3-iso-C₅H₁₁OCH₂ | H | H | 4-F | H |

TABLE 5

| Compound No. | R¹ | R² | R³ | R⁴ | R⁵ |
|---|---|---|---|---|---|
| 98 | 3-iso-C₅H₁₁OCH₂ | H | H | H | H |
| 99 | 3-iso-C₅H₁₁OCH₂ | H | H | 4-CH₃O | H |
| 100 | 3-n-C₆H₁₃OCH₂CH₂OCH₂ | H | H | H | H |
| 101 | 3-n-C₄H₉OCH₂CH₂OCH₂ | H | H | H | H |
| 102 | 3-n-C₄H₉(OCH₂CH₂)₂OCH₂ | H | H | H | H |
| 103 | 3-C₂H₅OCH₂CH₂OCH₂ | H | H | H | H |
| 104 | 3-CH₂=CHCH₂OCH₂CH₂OCH₂ | H | H | H | H |
| 105 | 3-iso-C₄H₉OCH₂CH₂OCH₂ | H | H | H | H |
| 106 | 3-PhCH₂OCH₂CH₂OCH₂ | H | H | H | H |
| 107 | 3-CH₃OCH₂CH₂OCH₂ | H | H | H | H |
| 108 | 3-iso-C₃H₇OCH₂CH₂OCH₂ | H | H | H | H |
| 109 | 3-PhOCH₂CH₂CH₂OCH₂ | H | H | H | H |
| 110 | 3-m-CH₃PhOCH₂CH₂OCH₂ | H | H | H | H |
| 111 | 3-P-ClPhOCH₂CH₂OCH₂ | H | H | H | H |
| 112 | 3-C₂H₅OCH₂ | 4-Cl | H | H | H |
| 113 | 3-C₂H₅OCH₂ | H | H | 2-F | H |
| 114 | 3-C₂H₅OCH₂ | H | H | H | H |
| 115 | 3-CH₂=CHCH₂OCH₂ | H | H | 2-F | H |
| 116 | 3-CH₂=CHCH₂OCH₂ | H | H | H | H |
| 117 | 3-CH₃CH₂(CH₃)CHCH₂OCH₂ | 4-Cl | H | H | H |
| 118 | 3-CH₃CH₂(CH₃)CHCH₂OCH₂ | H | H | 2-F | H |
| 119 | 3-CH₃CH₂(CH₃)CHCH₂OCH₂ | H | H | H | H |
| 120 | 3-iso-C₄H₉OCH₂ | H | H | H | H |
| 121 | 3-PhCH₂OCH₂ | 4-Cl | H | H | H |
| 122 | 3-PhCH₂OCH₂ | H | H | 2-F | H |

TABLE 6

| Compound No. | R¹ | R² | R³ | R⁴ | R⁵ |
|---|---|---|---|---|---|
| 123 | 3-PhCH$_2$OCH$_2$ | H | H | H | H |
| 124 | 3-o-CH$_3$PhCH$_2$OCH$_2$ | H | H | H | H |
| 125 | 3-m-CH$_3$PhCH$_2$OCH$_2$ | H | H | H | H |
| 126 | 3-p-CH$_3$PhCH$_2$OCH$_2$ | H | H | H | H |
| 127 | 3-o-ClPhCH$_2$OCH$_2$ | H | H | H | H |
| 128 | 3-m-ClPhCH$_2$OCH$_2$ | H | H | H | H |
| 129 | 3-p-ClPhCH$_2$OCH$_2$ | H | H | H | H |
| 130 | 3-o-FPhCH$_2$OCH$_2$ | H | H | H | H |
| 131 | 3-m-FPhCH$_2$OCH$_2$ | H | H | H | H |
| 132 | 3-p-FPhCH$_2$OCH$_2$ | H | H | H | H |
| 133 | 3-m-CH$_3$OPhCH$_2$OCH$_2$ | H | H | H | H |
| 134 | 3-CH$_3$OCH$_2$ | H | H | H | H |
| 135 | 3-CF$_3$(CF$_3$)CHOCH$_2$ | H | H | H | H |
| 136 | 3-n-C$_3$H$_7$(CH$_3$)CHOCH$_2$ | H | H | H | H |
| 137 | 3-iso-C$_3$H$_7$OCH$_2$ | H | H | H | H |
| 138 | 3-HOCH$_2$ | H | H | H | H |
| 139 | 3-PhOCH$_2$ | 4-Cl | H | H | H |
| 140 | 3-PhOCH$_2$ | H | H | 2-F | H |
| 141 | 3-PhOCH$_2$ | H | H | H | H |
| 142 | 3-o-CF$_3$PhOCH$_2$ | H | H | H | H |
| 143 | 3-m-CF$_3$PhOCH$_2$ | H | H | H | H |
| 144 | 3-p-CF$_3$PhOCH$_2$ | H | H | H | H |
| 145 | 3-o-CH$_3$PhOCH$_2$ | H | H | H | H |
| 146 | 3-m-CH$_3$PhOCH$_2$ | H | H | H | H |
| 147 | 3-p-CH$_3$PhOCH$_2$ | H | H | H | H |

TABLE 7

| Compound No. | R¹ | R² | R³ | R⁴ | R⁵ |
|---|---|---|---|---|---|
| 148 | 3-p-ClPhOCH$_2$ | H | H | 2-F | H |
| 149 | 3-p-ClPhOCH$_2$ | H | H | H | H |
| 150 | 3-o-FPhOCH$_2$ | H | H | H | H |
| 151 | 3-m-FPhOCH$_2$ | H | H | H | H |
| 152 | 3-p-FPhOCH$_2$ | H | H | 2-F | H |
| 153 | 3-p-FPhOCH$_2$ | H | H | H | H |
| 154 | 3-C$_6$F$_5$OCH$_2$ | H | H | H | H |
| 155 | 3-p-CH$_3$OPhOCH$_2$ | H | H | H | H |
| 156 | 2-CH$_3$ | 3-CH$_3$ | 4-CH$_3$ | H | H |
| 157 | 2-CH$_3$ | 3-CH$_3$ | H | H | H |
| 158 | 2-CH$_3$ | 4-CH$_3$ | H | H | H |
| 159 | 2-CH$_3$ | 4-CH$_3$ | 5-CH$_3$ | H | H |
| 160 | 2-CH$_3$ | 5-CH$_3$ | H | H | H |
| 161 | 2-CH$_3$ | 6-CH$_3$ | H | H | H |
| 162 | 2-CH$_3$ | 3-Cl | H | H | H |
| 163 | 2-CH$_3$ | 4-Cl | H | H | H |
| 164 | 2-CH$_3$ | H | H | H | H |
| 165 | 3-CH$_3$ | 4-CH$_3$ | H | 4-Br | H |
| 166 | 3-CH$_3$ | 4-CH$_3$ | H | 2-CH$_3$ | H |
| 167 | 3-CH$_3$ | 4-CH$_3$ | H | 3-CH$_3$ | 4-CH$_3$ |
| 168 | 3-CH$_3$ | 4-CH$_3$ | H | 3-CH$_3$ | H |
| 169 | 3-CH$_3$ | 4-CH$_3$ | H | 4-CH$_3$ | H |
| 170 | 3-CH$_3$ | 4-CH$_3$ | H | 2-Cl | H |
| 171 | 3-CH$_3$ | 4-CH$_3$ | H | 3-Cl | 4-Cl |
| 172 | 3-CH$_3$ | 4-CH$_3$ | H | 3-Cl | H |

TABLE 8

| Compound No. | R¹ | R² | R³ | R⁴ | R⁵ |
|---|---|---|---|---|---|
| 173 | 3-CH$_3$ | 4-CH$_3$ | H | 4-Cl | H |
| 174 | 3-CH$_3$ | 4-CH$_3$ | H | 4-F | H |
| 175 | 3-CH$_3$ | 4-CH$_3$ | H | H | H |
| 176 | 3-CH$_3$ | 4-CH$_3$ | H | 4-NO$_2$ | H |
| 177 | 3-CH$_3$ | 4-CH$_3$ | H | 4-CH$_3$O | H |
| 178 | 3-CH$_3$ | 5-CH$_3$ | H | H | H |
| 179 | 3-CH$_3$ | 4-Cl | H | H | H |
| 180 | 3-CH$_3$ | 5-Cl | H | H | H |
| 181 | 3-CH$_3$ | 4-F | H | H | H |
| 182 | 3-CH$_3$ | H | H | 4-Br | H |

TABLE 8-continued

| Compound No. | R¹ | R² | R³ | R⁴ | R⁵ |
|---|---|---|---|---|---|
| 183 | 3-CH$_3$ | H | H | 2-CH$_3$ | H |
| 184 | 3-CH$_3$ | H | H | 3-CH$_3$ | H |
| 185 | 3-CH$_3$ | H | H | 3-CH$_3$ | 4-CH$_3$ |
| 186 | 3-CH$_3$ | H | H | 4-CH$_3$ | H |
| 187 | 3-CH$_3$ | H | H | 2-Cl | H |
| 188 | 3-CH$_3$ | H | H | 3-Cl | H |
| 189 | 3-CH$_3$ | H | H | 3-Cl | 4-Cl |
| 190 | 3-CH$_3$ | H | H | 4-Cl | H |
| 191 | 3-CH$_3$ | H | H | 4-F | H |
| 192 | 3-CH$_3$ | H | H | H | H |
| 193 | 3-CH$_3$ | H | H | 4-NO$_2$ | H |
| 194 | 3-CH$_3$ | H | H | 4-CH$_3$O | H |
| 195 | 4-CH$_3$ | H | H | H | H |
| 196 | 4-iso-C$_3$H$_7$ | H | H | H | H |
| 197 | 3-CN | H | H | H | H |

TABLE 9

| Compound No. | R¹ | R² | R³ | R⁴ | R⁵ |
|---|---|---|---|---|---|
| 198 | 3-COOCH$_3$ | H | H | H | H |
| 199 | 3-COO-iso-C$_3$H$_7$ | H | H | H | H |
| 200 | 2-Cl | 3-CH$_3$ | H | H | H |
| 201 | 2-Cl | 4-CH$_3$ | H | H | H |
| 202 | 2-Cl | 3-Cl | H | H | H |
| 203 | 2-Cl | 4-Cl | H | H | H |
| 204 | 2-Cl | H | H | H | H |
| 205 | 3-Cl | 4-CH$_3$ | H | H | H |
| 206 | 3-Cl | 4-Cl | H | H | H |

TABLE 10

| Compound No. | R¹ | R² | R³ | R⁴ | R⁵ |
|---|---|---|---|---|---|
| 207 | 3-Cl | 5-Cl | H | H | H |
| 208 | 3-Cl | H | H | H | H |
| 209 | 4-Cl | H | H | H | H |
| 210 | 2-F | H | H | 3-CHF$_2$CF$_2$CH$_2$OCH$_2$ | H |
| 211 | 3-F | H | H | H | H |
| 212 | 4-F | H | H | H | H |
| 213 | H | H | H | 4-Br | H |
| 214 | H | H | H | 3-CH$_2$F | H |
| 215 | H | H | H | 3-n-C$_3$F$_6$CH$_2$OCH$_2$ | H |
| 216 | H | H | H | 3-C$_2$F$_5$CH$_2$OCH$_2$ | H |
| 217 | H | H | H | 3-CHF$_2$CF$_2$CH$_2$OCH$_2$ | H |
| 218 | H | H | H | 3-CF$_3$CHFCF$_2$CH$_2$OCH$_2$ | H |
| 219 | H | H | H | 2-CH$_3$ | H |
| 220 | H | H | H | 3-CH$_3$ | H |
| 221 | H | H | H | 3-CH$_3$ | 4-CH$_3$ |
| 222 | H | H | H | 3-CH$_3$ | H |
| 223 | H | H | H | 4-CH$_3$ | H |
| 224 | H | H | H | 2-Cl | H |
| 225 | H | H | H | 3-Cl | H |
| 226 | H | H | H | 3-Cl | 4-Cl |
| 227 | H | H | H | 4-Cl | H |
| 228 | H | H | H | 4-F | H |
| 229 | H | H | H | H | H |
| 230 | H | H | H | 4-NO$_2$ | H |
| 231 | H | H | H | 4-CH$_3$O | H |
| 232 | 4-I | H | H | H | H |
| 233 | 4-NO$_2$ | H | H | H | H |
| 234 | 2-CH$_3$O | 5-Cl | H | H | H |
| 235 | 4-CH$_3$O | H | H | H | H |
| 236 | 3-CH$_3$S | H | H | H | H |

Other features of the invention will become apparent in the course of the following description of the exemplary embodiments which are given for illustration of the invention and are not intended to be limiting.

EXAMPLES

Example 1

Preparation of 2-phenyl-4,5-oxazoledione 4-[4-chloro-3-(2,2,3,3,3-pentafluoropropoxymethyl)phenylhydrazone]

2,661 gm (9.19 mol) of 4-chloro-3-(2,2,3,3,3-pentafluoropropoxymethyl)aniline, and 4,550 ml of acetic acid, 2,110 ml of concentrated hydrochloric acid were charged into a 50 l glass-lined reaction vessel. A solution of 634 gm (9.19 mol) of sodium nitrite in 930 ml of water was added dropwise to the mixture while stirring under cooling so as not to raise the temperature above 10° C. After the addition, the mixture was stirred for 15 minutes.

To the resulting reaction mixture was added 1,568 gm of anhydrous sodium acetate while maintaining the temperature below 10° C., followed by the further addition of 1,729 gm (9.65 mol) of hippuric acid and 8,656 gm of acetic anhydride, in this order. After the addition, the mixture was heated to 30° C. and stirred for 16 hours.

After the addition of 6,200 ml of water, the reaction mixture was filtered to collect 2-phenyl-4,5-oxazoledione 4-[4-chloro-3-(2,2,3,3,3,-pentafluoropropoxymethyl)-phenylhydrazone], which was washed with water and toluene, and dried to obtain 3,660 gm of the product. The purity of the product measured by HPLC was 98.5% and the yield corrected for purity was 85.0%.

Example 2

Preparation of 2-phenyl-4,5-oxazoledione 4-[4-chloro-3-(2,2,3,3,3-pentafluoropropoxylmethyl)phenylhydrazone]

29 gm (0.1 mol) of 4-chloro-3-(2,2,3,3,3,-pentafluoropropoxymethyl)aniline, 50 ml of acetic acid, and 23 ml (0.26 mol) of concentrated hydrochloric acid were charged into a 500 ml four-necked flask. A solution of 7.24 gm (0.105 mol) of sodium nitrite in 10 ml of water was added dropwise to the mixture while stirring under ice-cooling so as not to raise the temperature above 10° C. After the addition of sodium nitrite, the mixture was stirred for 20 minutes, followed by the addition of a solution of 0.74 gm of sulfamic acid (0.075 equivalent to sodium nitrite) in 7 ml of water to decompose a surplus amount of sodium nitrite in the mixture.

To the acidic solution containing a diazonium salt was added 15.09 gm (0.184 mol) of sodium acetate, by portions, followed by a further addition of 18.8 gm (0.105 mol) of hippuric acid and 93.05 gm of acetic anhydride. After the addition, the mixture was heated to 20° C. and stirred for 16 hours.

After the addition of 180 ml of water, the mixture was stirred for 15 minutes to collect the precipitate by filtration. The cake thus obtained was washed with water and toluene in turn, and dried to obtain 39.58 gm of the title compound. The purity of the product was 98.1% and the yield corrected for purity was 84.1%. The yield calculated by combining 2.64 gm of the title compound contained in the toluene washing was 89.8%.

Example 3

Preparation of 2-phenyl-4,5-oxazoledione 4-[4-chloro-3-(2,2,3,3,3-(2,2,3,3,3-pentafluoropropoxylmethyl) phenylhydrazone]

29 gm (0.1 mol) of 4-chloro-3-(2,2,3,3,3,-pentafluoropropoxymethyl)aniline, 50 ml of acetic acid, and 23 ml (0.26 mol) of concentrated hydrochloric acid were charged into a 500 ml four-necked flask. A Solution of 7.24 gm (0.105 mol) of sodium nitrite in 10 ml of water was added dropwise to the mixture while stirring under ice-cooling so as not to raise the temperature above 10° C. After the addition of sodium nitrite, the mixture was stirred for 20 minutes, followed by the addition of a solution of 0.74 gm of sulfamic acid (0.075 equivalent to sodium nitrite) in 7 ml of water to decompose a surplus amount of sodium nitrite in the mixture.

To the acidic solution containing a diazonium salt was added 15.09 gm (0.184 mol) of sodium acetate, by portions, followed by a further addition of 18.8 gm (0.105 mol) of hippuric acid and 93.05 gm of acetic anhydride. After the addition, the mixture was heated to 20° C. and stirred for 16 hours.

After the addition of 180 ml of water, the mixture was stirred for 15 minutes to collect the precipitate by filtration. The cake thus obtained was washed with water and toluene in turn, and dried to obtain 39.58 gm of the title compound. The purity of the product was 98.1% and the yield corrected for purity was 84.1%. The yield calculated by combining 2.64 gm of the title compound contained in the toluene washing was 89.8%.

Example 3

Preparation of 2-phenyl-4,5-oxazoledione 4-[4-chloro-3-(2,2,3,3,3-pentafluoropropoxymethyl)phenylhydrazone]

29 gm (0.1 mol) of 4-chloro-3-(2,2,3,3,3-pentafluoropropoxymethyl)aniline, 50 ml of acetic acid, and 23 ml (0.26 mol) of concentrated hydrochloric acid were charged into a 500 ml four-necked flask. A solution of 7.24 gm (0.105 mol) of sodium nitrite in 10 ml of water was added dropwise to the mixture while stirring under ice-cooling so as not to raise the temperature above 10° C. After the addition of sodium nitrite, the mixture was stirred for 15 minutes, followed by the addition of a solution of 0.49 gm of sulfamic acid (0.05 equivalent to sodium nitrite) in 3.5 ml of water to decompose a surplus amount of sodium nitrite in the mixture.

To the acidic solution containing a diazonium salt was added 13.8 gm (0.168 mol) of sodium acetate, by portions, followed by the further addition of 18.8 gm (0.105 mol) of hippuric acid and 93.05 gm of acetic anhydride. After the addition of acetic anhydride, the mixture was heated to 30° C. and stirred for 16 hours.

After the addition of 140 ml of water, the mixture was stirred for 15 minutes to collect the precipitate by filtration. The cake thus obtained was washed with water and toluene in turn, and dried to obtain 38.85 gm of the title compound. The purity of the product was 97.95% and the yield corrected for purity was 82.5%. The yield calculated by combining 2.56 gm of the title compound contained in the toluene washing was 87.9%.

Example 4

Preparation of 2-phenyl-4,5-oxazoledione 4-[4-chloro-3-(2,2,3,3,3-pentafluoropropoxymethyl)phenylhydrazone].

29 gm (0.1 mol) of 4-chloro-3-(2,2,3,3,3-pentafluoropropoxymethyl)aniline, 50 ml of acetic acid, and 23 ml (0.26 mol) of concentrated hydrochloric acid were charged into a 500 mol four-neck flask. A solution of 7.24 gm (0.105 mol) of sodium nitrite in 10 ml of water was added dropwise to the mixture while stirring under ice-cooling so as not to raise the temperature above 10° C. After the addition of sodium nitrite, the mixture was stirred for 15 minutes, followed by the addition of a solution of 0.49 gm of sulfamic acid (0.05 equivalent to sodium nitrite) in 3.5 ml of water to decompose a surplus amount of sodium nitrite in the mixture.

To the acidic solution containing a diazonium salt was added 15.09 gm (0.184 mol) of sodium acetate, by portions, followed by the further addition of 18.8 gm (0.105 mol) of hippuric acid and 17.31 gm of acetic anhydride. After the addition of acetic anhydride, the mixture was heated to 25° C. and 75.74 gm acetic anhydride was further added, followed by stirring for 16 hours.

After the addition of 180 ml of water, the mixture was stirred for 15 minutes to collect the precipitate by filtration. The cake thus obtained was washed with water and toluene in turn, and dried to obtain 39.2 gm of the title compound. The purity of the product was 97.1% and the yield corrected for purity was 82.7%. The yield calculated by combining 2.39 gm of the title compound contained in the toluene washing was 87.6%.

Example 5

Preparation of 2-phenyl-4,5-oxazoledione 4-[4-chloro-3-(2,2,3,3,3-pentafluoropropoxymethyl)phenylhydrazone]

29 gm (0.1 mol) of 4-chloro-3-(2,2,3,3,3-pentafluoropropoxymethyl)aniline, 50 ml of acetic acid, and 23 ml (0.26 mol) of concentrated hydrochloric acid were charged into a 500 ml four-necked flask. A solution of 7.24 gm (0.105 mol) of sodium nitrite in 10 ml of water was added dropwise to the mixture while stirring under ice-cooling so as not to raise the temperature above 10° C. After the addition of sodium nitrite, the mixture was stirred for 15 minutes, followed by the addition of 0.6 gm of urea (0.1 equivalent to sodium nitrite) to decompose a surplus amount of sodium nitrite in the mixture.

To the acidic solution containing a diazonium salt was added 15.09 gm (0.184 mol) of sodium acetate, by portions, followed by the further addition of 18.8 gm (0.105 mol) of hippuric acid and 30 ml of acetic anhydride. After that, 20 ml, 20 ml, and 16 ml of acetic anhydride were added at an interval of 10 minutes. After the addition, the mixture was heated to 35° C. for 6 hours. After terminating the heating, the mixture was further reacted for 10 hours.

After the addition of 180 ml of water, the mixture was stirred for 15 minutes to collect the precipitate by filtration. The cake thus obtained was washed with water and toluene in turn, and dried to obtain 40.2 gm of the title compound. The purity of the product was 97.0% and the yield corrected for purity was 84.6%. The yield calculated by combining 1.00 gm of the title compound contained in the toluene washing was 86.6%.

Example 6

Preparation of 2-phenyl-4,5-oxazoledione 4-phenylhydrazone 9.3 gm (0.1 mol) of aniline, 50 ml of acetic acid, and 23 mol (0.26 mol) of concentrated hydrochloric acid were charged into 1 500 ml four-necked flask. A solution of 7.24 Gun (0.105 mol) of sodium nitrite in 10 ml of water was added dropwise to the mixture while stirring under ice-cooling so as not to raise the temperature above 5° C. After the addition of sodium nitrite, the mixture was stirred for 20 minutes.

To the acidic solution containing a diazonium salt was added 15.09 gm (0.184 mol) of sodium acetate, by portions, followed by the further addition of 18.8 gm (0.105 mol) of hippuric acid and 93.05 gm of acetic anhydride. After the addition of acetic anhydride, the mixture was heated to 25° C. and further reacted at this temperature for 16 hours.

After the addition of 200 ml of water, the mixture was stirred for 15 minutes to collect the precipitate by filtration. The cake thus obtained was washed 3 times with 150 ml of water, and dried to obtain 18.83 gm of the title compound. The purity of the product was 98.8% and the yield corrected for purity was 70.2%. mp:200°–203° C.

Example 7

Preparation of 2-phenyl-4,5-oxazoledione 4-(m-tolyhydrazone)

10.7 gm (0.1 mol) of m-toluidine, 50 ml of acetic acid, and 23 ml (0.26 mol) of concentrated hydrochloric acid were charged into a 500 ml four-necked flask. A solution of 7.24 gm (0.105 mol) of sodium nitrite in 10 ml of water was added dropwise to the mixture while stirring under ice-cooling so as not to raise the temperature above 4° C. After the addition of sodium nitrite, the mixture was stirred for 20 minutes.

To the acidic solution containing a diazonium salt was added 15.09 gm (0.184 mol) of sodium acetate, by portions, followed by the further addition of 18.8 gm (0.105 mol) of hippuric acid and 93.05 gm of acetic anhydride. After the addition of acetic anhydride, the mixture was heated to 25° C. and further reacted at this temperature for 16 hours.

After the addition of 200 ml of water, the mixture was stirred for 15 minutes to collect the precipitate by filtration. The cake thus obtained was washed 3 times with 200 ml of water, and dried to obtain 19.3 gm of the title compound. The purity of the product was 99.7% and the yield corrected for purity was 68.9mp: 194°–195° C.

Comparative Example 1

Preparation of 2-phenyl-4,5-oxazoledione 4-[4-chloro-3-(2,2,3,3,3-pentafluoropropoxymethyl)phenylhydrazone]

A. Preparation of diazonium salt 29 gm (0.1 mol) of 4-chloro-3-(2,2,3,3,3-pentafluoropropoxymethyl)aniline, 50 ml of acetic acid, and 23 ml (0.26 mol) of concentrated hydrochloric acid were charged into a 500 ml beaker and ice-cooled. A solution of 7.11 gm (0.105 mol) of sodium nitrite in 15 mol of water was added dropwise to the mixture while stirring so as not to raise the temperature above 5° C. After the addition of sodium nitrite, the mixture was stirred for 20 minutes.

B. Preparation of 2-phenyl-5(4H)-oxazolone 23.3 gm (0.13 mol) of hippuric acid, 93.05 gm of acetic anhydride, and 50 ml of toluene were charged into a 500 ml eggplant-type flask, and heated on an oil bath at a temperature of 90° C. for 10 minutes to dissolution, followed by immediate quenching the resultant solution. The produced liquid was kept at −20° C. on a dry ice-methanol bath.

C. Preparation of diazonium salt and diazo coupling

To the diazonium salt which had been previously prepared was added a solution of 0.49 gm of sulfamic acid in 3.5 ml of water, followed by an addition of 13.8 gm (0.168 mol) of anhydrous sodium acetate, by portions. To the diazonium mixture was added at one time 2-phenyl-5(4H)-oxazolone which had been separately prepared. The temperature went down to −5° C., at which temperature the reaction was carried out for 4 hours. After terminating the cooling, the mixture was stirred at 20° C. for 12 hours.

After the addition of 140 ml of water, the reaction mixture was stirred for 10 minutes to collect the precipitate by filtration. The cake thus obtained was washed with water and toluene in turn, and dried to obtain 38.85 gm of 2-phenyl-4,5-oxazoledione 4-[4-chloro-3-(2,2,3,3,3-pentafluoropropoxymethyl)phenylhydrazone]which is the target compound (purity: 98.4%) in the yield of 82.9%. The yield calculated by combining 2.92 gm of hydrazone contained in the toluene washing was 89.1%.

Comparative Example 2

Preparation of 2-phenyl-4,5-oxazoledione 4-[4-chloro-3-(2,2,3,3,3-pentafluoropropoxymethyl)phenylhydrazone]

A. Preparation of 2-phenyl-5(4H)-oxazolone 23.3 gm of hippuric acid and 93.05 gm of acetic anhydride were charged into a 500 ml eggplant-type flask, and heated on an oil bath at a temperature of 90° C. for 10 minutes. Immediately after the mixture became transparent, it was quenched and kept at 1°–2° C. in ice-water.

B. Preparation of diazonium salt and diazo coupling 29 gm (0.1 mol) of 4-chloro-3-(2,2,3,3,3-pentafluoropropoxymethyl)aniline and 50 ml of acetic acid were placed into a 1 l reaction vessel. To this was added 23 ml of concentrated hydrochloric acid and, while stirring, was further added dropwise 7.5 gm of sodium nitrite dissolved in 15 ml of water so as not to raise the temperature above 5° C. After the addition of sodium nitrite, the mixture was stirred for 20 minutes, followed by the addition of 17.2 gm of anhydrous sodium acetate and the 2-phenyl-5(4H)-oxazolone solution which had been prepared prior to 5 hours. The resulting mixture was stirred for 2 hours while controlling the temperature before 5° C., and at 20° C. for 14 hours.

After the addition of 50 ml of water, the reaction mixture was filtered, washed with water and toluene in turn, and dried to obtain 20.7 gm of the title compound in a yield of 44.9%.

Comparative Example 3

Preparation of 2-phenyl-4,5-oxazoledione 4-[4-chloro-3-(2,2,3,3,3-pentafluoropropoxymethyl)phenylhydrazone]

A. Preparation of diazonium salt 818 gms (2.82 mol) of an aniline derivative, 1,400 ml of acetic acid, and 648 ml (7.33 mol of concentrated hydrochloric acid were charged into a 15 l glass lined reaction vessel and cooled to 5° C. A solution of 195 gm (2.82 mol) of sodium nitrite in 286 ml of water was added dropwise to the mixture while thoroughly stirring so as to control the temperature below 5° C.

B. Preparation of 2-phenyl-5(4H)-oxazolone 657 gm (3.66 mol) of hippuric acid and 2,618 gm of acetic anhydride were charged into a 5 l glass reaction vessel, and heated at 80° C. for 15 minutes. When the reaction liquid became transparent, the reaction vessel was placed into a water bath to lower the internal temperature to 30° C., followed by cooling to 0° C. on a dry ice-methanol bath.

C. Neutralization of diazonium salt and diazo coupling

To the diazonium salt which had been previously prepared was added 485 gm of (5.91 mol) of anhydrous sodium acetate, by portions, while controlling the temperature below 5° C. After the neutralization, the mixture was cooled to −10° C., and to this was added 2-phenyl-5(4H)-oxazolone which had been cooled to 0° C. The mixture was reacted at a temperature below 5° C. for 4 hours, and at 20° C. for 12 hours.

After the addition of 1,900 ml of water, the reaction mixture was stirred and filtered. The cake was washed with water and then with toluene, and dried to obtain 997 gm of the title compound. The purity determined by HPLC was 97.9%. The yield as converted 100% purity compound was 75.0%.

The raw materials, the reaction conditions, etc., are summarized in Tables 11 and 12.

TABLE 11

MANUFACTURE OF HYDRAZONE DERIVATIVES - RAW MATERIALS AND NEUTRALIZATION AGENT, AND THEIR AMOUNTS USED

| Example | Aniline Derivative gm (mol) | Hippuric Acid* Derivative gm (mol) | Acetic Anhydride (g) | Sodium Acetate gm (mol) |
| --- | --- | --- | --- | --- |
| Example | | | | |
| 1 | 2,661 (9.19) | 1,729 (9.65) | 8,656 | 1,578 (91.24) |
| 2 | 29 (0.1) | 18.8 (0.105) | 93.05 | 15.09 (0.184) |
| 3 | 29 (0.1) | 18.8 (0.105) | 93.05 | 13.8 (0.168) |
| 4 | 29 (0.1) | 18.8 (0.105) | 93.05 | 15.09 (0.184) |
| 5 | 29 (0.1) | 18.8 (0.105) | 93.05 | 15.09 (0.184) |
| 6 | 9.3 (0.1) | 18.8 (0.105) | 93.05 | 15.09 (0.184) |
| 7 | 10.7 (0.1) | 18.8 (0.105) | 93.05 | 15.09 (0.184) |
| Comparative Example | | | | |
| 1 | 29 (0.1) | 23.03 (0.13) | 93.05 | 13.8 (0.168) |
| 2 | 29 (0.1) | 23.03 (0.13) | 93.05 | 17.2 (0.210) |
| 3 | 818 (2.82) | 657 (3.66) | 2,618 | 485 (5.91) |

*The hippuric acid derivative was used 1.05 equivalent to the aniline derivative in Examples 1–7, but 1.3 equivalent in Comparative Examples 1–3.

To the aniline derivative, 1.05 equivalent of hippuric acid was used in Examples 1–7, and 1.3 equivalent of hippuric acid was used in Comparative Examples 1–3.

TABLE 12

REACTION CONDITIONS IN EACH STEP

| | Diazonium Production | | Production of Oxazolone Derivative | | | | Production of Hydrazone Derivative | | |
| --- | --- | --- | --- | --- | --- | --- | --- | --- | --- |
| | Temperature (°C.) | Time*[1] (min) | Dissolution Temperature*[2] | Dissolution Time | Cooling Temperature | Residence Time*[3] | Temperature (°C.) | Reaction Time (hour) | Yield (%) |
| Example | | | | | | | | | |
| 1 | <10 | 15 | No step for the production of oxazolone derivative | | | | <10–30 | 16 | 85.0 |
| 2 | <10 | 20 | No step for the production of oxazolone derivative | | | | <10–20 | 16 | 89.8 |
| 3 | <10 | 15 | No step for the production of oxazolone derivative | | | | <10–30 | 16 | 87.9 |

TABLE 12-continued

| | REACTION CONDITIONS IN EACH STEP | | | | | | | | |
|---|---|---|---|---|---|---|---|---|---|
| | Diazonium Production | | Production of Oxazolone Derivative | | | | Production of Hydrazone Derivative | | |
| | Temperature (°C.) | Time*¹ (min) | Dissolution Temperature*² | Dissolution Time | Cooling Temperature | Residence Time*³ | Temperature (°C.) | Reaction Time (hour) | Yield (%) |
| 4 | <10 | 15 | No step for the production of oxazolone derivative | | | | <10–25 | 16 | 87.6 |
| 5 | <10 | 15 | No step for the production of oxazolone derivative | | | | <10–35 | 16 | 86.6 |
| 6 | <5 | 20 | No step for the production of oxazolone derivative | | | | <5–25 | 16 | 70.2 |
| 7 | <5 | 20 | No step for the production of oxazolone derivative | | | | <5–25 | 16 | 68.9 |
| Comparative Example | | | | | | | | | |
| 1 | <5 | 20 | 90° C. | 10 min | −20° C. | 10 min | −5–20 | (4 + 12) | 89.1 |
| 2 | <5 | 20 | 90° C. | 10 min | 1–2° C. | 5 hour | <5–20 | (2 + 14) | 44.9 |
| 3 | <5 | 15 | 80° C. | 15 min | 0° C. | 30 min | <5–20 | (4 + 12) | 75.0 |

*¹The time required for the addition of sodium nitrite is excluded.
*²The dissolution temperature for Comparative Examples 1 and 2 are temperatures of the oil bath. The dissolution temperature for Comparative Example 3 is the temperature of the contents.
*³The resident time is the waiting time for the next step.

The following Examples illustrate the preparation of 2-phenyl-4,5-oxazoledione 4-[4-chloro-3-(2,2,3,3,3-pentafluoropropoxymethyl) phenylhydrazone] (hereinafter referred to as the target compound), in which various basic compounds were used for the neutralization.

Example 8

20 gm (0.069 mol) of 4-chloro-3-(2,2,3,3,3-pentafluoropropoxymethyl) aniline, 35.74 gm of acetic acid, and 14.40 gm (0.138 mol) of concentrated hydrochloric acid were charged into a four-necked flask and cooled to 0° C. A solution of 5.00 gm (0.069×1.05 mol) of sodium nitrite in 6.88 gm of water was added to the mixture in 15 minutes while controlling the temperature of the reaction mixture at 0°–5° C. After the addition of sodium nitrite, the mixture was stirred for a further 10 minutes to obtain an acidic solution containing diazonium salt.

To the acidic solution containing a diazonium salt thus obtained were added at 20° C., 14.22 gm (0.069×1.15 mol) of hippuric acid and 42.28 gm (0.069×6.00 mol) of acetic anhydride, and then 3.88 gm (0.069×1.00 mol) of pulverized calcium oxide. After the addition, the heat of neutralization was removed by cooling on a water bath to maintain the temperature at 30°±1° C. After the heat removal was no longer necessary, the mixture was heated at 30°±1° C.

Four hours after the addition of calcium oxide, 200 ml of water was added, and the mixture was cooled to 10° C. and stirred for 30 minutes. The yellow precipitate was collected by filtration, washed 3 times with water, and dried at 80° C. for 15 minutes to obtain 31.67 gm (purity: 98.74%) of the target compound. The yield corrected for purity was 98.16%.

Example 9

To the acidic solution containing a diazonium salt prepared from 10 gm (0.0345 mol) of 4-chloro-3-(2,2,3,3,3-pentafluoropropoxymethyl)aniline in the same manner as in Example 8 were added 7.11 gm (0.0345×1.15 mol) of hippuric acid and 5.285 gm (0.0345×1.5 mol) of acetic anhydride, and the mixture was cooled to 10° C. To this was added 0.485 gm (0.0345×0.25 mol) of pulverized calcium oxide, followed by rapid heating of 20° C. Thereafter, the mixture was maintained at 20°±1° C. by cooling from time to time.

One and half hours thereafter, the reaction mixture was temporarily cooled to 15° C. to add 5.285 gm of acetic anhydride and 0.485 gm of calcium oxide. This procedure of the addition of acetic anhydride and calcium oxide was repeated twice at an interval of 1.5 hours. The mixture was maintained at the same temperature for a further 1.5 hours after the last addition, following which it was heated at 30° C. on an oil bath for 2 hours. The heat of neutralization was removed by cooling on a water bath to maintain the temperature at 30°±1° C. After the removal of heat was no longer necessary, the mixture was heated at 30°±1° C.

100 ml of water was added to the neutralized product, and the procedure of Example 8 was followed to obtain 15.63 gm of a yellow solid of the target compound with a purity of 98.02%. The yield corrected for purity was 96.14%.

Example 10

An acidic solution containing diazonium salt prepared from 10 gm (0.345 mol) of 4-chloro-3- (2,2,3,3,3-pentafluoropropoxymethyl)aniline in the same manner as in Example 8 was divided into 4 equal portions. To one of the portions were added at 10° C., 7.11 gm (0.0345×1.14 mol) of hippuric acid, 21.14 gm (0.0345×6.00 mol) of acetic anhydride, and 1.94 gm (0.0345×1.00 mol) of pulverized calcium oxide.

The whole mixture soon solidified whereupon the remaining portions of the acidic solution containing diazonium salt were added and reacted for 2 hours at 30° C.

100 ml of water was added to the reaction mixture, and the procedure of Example 8 was followed to obtain 14.31 gm of yellow solid of the target compound with a purity of 98.09%. The yield corrected for purity was 88.14%.

Example 11

An acidic solution containing diazonium salt prepared from 10 gm (0.0345 mol) of 4-chloro-3-(2,2,3,3,3-pentafluoropropoxymethyl)aniline was divided into 4 equal portions. To one of the portions were added at 15° C., 7.11 gm (0.0345×1.15 mol) of hippuric acid, 21.14 gm (0.0345×6.00 mol) of acetic anhydride, and 0.485 gm (0.0345×0.25 mol) of pulverized calcium oxide.

One and half hours thereafter, the reaction mixture was temporarily cooled to 15° C. and there was then added ⅓ of the remaining portions of the acidic solution containing diazonium salt and 0.485 gm of calcium oxide. This procedure of the addition of acidic solution containing diazonium salt and calcium oxide was repeated twice at an interval of 1.5 hours. The mixture was maintained at the same temperature for a further 1.5 hours after the last addition, following which it was heated at 30° C. on an oil bath for 2 hours. The heat of neutralization was removed in a water bath to maintain the temperature at 30°±1° C. After the heat removal was no longer necessary, the mixture was heated at 30°±1° C.

100 ml of water was added to the reaction mixture, and the procedure of Example 8 was followed to obtain 14.18 gm of yellow solid of the target compound with a purity of 97.81%. The yield corrected for purity was 87.06%.

Example 12

To the acidic solution containing a diazonium salt prepared in the same manner as in Example 8 from 10 gm (0.0345 mol) of 4-chloro-3-(2,2,3,3,3-pentafluoropropoxymethyl)aniline were added at 15° C., 7.11 gm (0.0345×1.15 mol) of hippuric acid and 21.14 gm (0.0345×6.00 mol) of acetic anhydride, and 0.485 gm (0.0345×0.25 mol) of pulverized calcium oxide.

Two hours thereafter, the reaction mixture was temporarily the addition of 0.485 gm of calcium oxide was repeated twice 2 hours and 3 hours thereafter. The mixture was maintained at the same temperature for a further 1.5 hours after the last addition, following which it was heated at 30° C. on an oil bath for 2 hours. The heat of neutralization was removed by cooling on a water bath to maintain the temperature at 30°±1° C. After the heat removal was no longer necessary, the mixture was heated at 30°±1° C.

100 ml of water was added to the reaction mixture, and the procedure of Example 8 was followed to obtain 12.79 gm of yellow solid of the target compound with a purity of 98.10%. The yield corrected for purity was 78.78%.

Example 13

An acidic solution containing a diazonium salt was prepared in the same manner as in Example 8 from 10 gm (0.0345 mol) of 4-chloro-3-(2,2,3,3,3-pentafluoropropoxymethyl)aniline. To this solution were added 7.11 gm (0.0397 mol) of hippuric acid and 21.14 gm (0.207 mol) of acetic anhydride, and then 1.07 gm (0.0190 mol) of pulverized calcium oxide at 20° C. The cyclization-coupling reaction was carried out at 20°–30° C. for 4 hours in the same manner as in Example 8 to obtain 15.93 gm of the target compound with a purity of 98.16%. The yield corrected for purity was 98.16%.

Example 14

An acidic solution containing a diazonium salt was prepared in the same manner as in Example 8 from 10 gm (0.0345 mol) of 4-chloro-3-(2,2,3,3,3-pentafluoropropoxymethyl)aniline. To this solution were added 7.11 gm (0.0397 mol) of hippuric acid and 21.14 gm (0.207 mol) of acetic anhydride, and then 5.29 gm (0.0345 mol) of pulverized barium oxide at 20° C. The cylization-coupling reaction was carried out at 20°–30° C. for 4 hours in the same manner as in Example 8 to obtain 13.33 gm of the target compound with a purity of 95.71%. The yield corrected for purity was 80.11%.

Example 15

An acidic solution containing a diazonium salt was prepared in the same manner as in Example 8 from 10 gm (0.0345 mol) of 4-chloro-3-(2,2,3,3,3-pentafluoropropoxymethyl)aniline. To this solution were added 7.11 gm (0.0397 mol) of hippuric acid and 21.14 gm (0.207 mol) of acetic anhydride, and then 2.81 gm (0.0345 mol) of pulverized zinc oxide at 20° C. The cyclization-coupling reaction was carried out at 20°–30° C. for 4 hours in the same manner as in Example 8 to obtain 14.870 gm of the target compound with a purity of 97.46%. The yield corrected for purity was 89.90%.

Example 16

An acidic solution containing a diazonium salt was prepared in the same manner as in Example 8 from 10 gm (0.0345 mol) of 4-chloro-3-(2,2,3,3,3-pentafluoropropoxymethyl)aniline. To this solution were added 7.11gm (0.0397 mol) of hippuric acid, 21.14 gm (0.207 mol) of acetic anhydride, and then 1.39 gm (0.0345 mol) of pulverized magnesium oxide at 20° C. The cyclization-coupling reaction was carried out at 20°–30° C. for 4 hours in the same manner as in Example 8 to obtain 15.92 gm of the target compound with a purity of 97.56%. The yield corrected for purity was 97.47%.

Example 17

An acidic solution containing a diazonium salt was prepared in the same manner as in Example 8 from 10 gm (0.0345 mol) of 4-chloro-3-(2,2,3,3,3-pentafluoropropoxymethyl)aniline. To this solution were added 7.11 gm (0.0397 mol) of hippuric acid and 21.14 gm (0.207 mol) of acetic anhydride, and then 6.81 gm (0.0345 mol) of pulverized barium carbonate at 20° C. The cyclization-coupling reaction was carried out at 20°–30° C. for 4 hours in the same manner as in Example 8 to obtain 14.18 gm of the target compound with a purity of 97.29%. The yield corrected for purity was 86.68%.

Example 18

An acidic solution containing a diazonium salt was prepared in the same manner as in Example 8 from 10 gm (0.0345 mol) of 4-chloro-3-(2,2,3,3,3-pentafluoropropoxymethyl)aniline. To this solution were added 7.11gm (0.0397 mol) of hippuric acid and 21.14 gm (0.207 mol) of acetic anhydride, and then 2.45 gm (0.0345 mol) of pulverized calcium carbonate at 20° C. The cyclization-couping reaction was carried out at 20–30% for 4 hours in the same manner as in Example 8 to obtain 15.92 gm of the target compound with a purity of 97.76%. The yield corrected for purity was 97.70%.

Example 19

An acidic solution containing a diazonium salt was prepared in the same manner as in Example 8 from 10 gm (0.0345 mol) of 4-chloro-3-(2,2,3,3,3-pentafluoropropoxymethyl)aniline. To this solution were added 7.11 gm (0.0397 mol) of hippuric acid and 21.14 gm (0.207 mol) of acetic anhydride, and then 5.46 gm (0.0345 mol) of pulverized calcium acetate at 20° C. The cyclization-coupling reaction was carried out at 20°–30° C. for 4 hours in the same manner as in Example 8 to obtain 15.91 gm of the target compound with a purity of 98.10%. The yield corrected for purity was 98.00%.

Example 20

An acidic solution containing a diazonium salt was prepared in the same manner as in Example 8 from 11.59 gm (0.04 mol) of 4-chloro-3-(2,2,3,3,3-pentafluoropropoxymethyl)aniline. To this solution were added 8.24 gm (0.046 mol) of hippuric acid, 36.75 gm (0.36 mol) of acetic anhydride, and then 8.10 gm (0.08 mol) of triethylamine at 20° C. The cyclization-coupling reaction was carried out at 15–35%C for 5 hours in the same manner as in Example 8 to obtain 16.82 gm of the target compound with a purity of 90.70%. The yield corrected for purity was 82.60%.

Example 21

An acidic solution containing a diazonium salt was prepared in the same manner as in Example 8 from 11.59 gm (0.04 mol) of 4-chloro-3-(2,2,3,3,3-pentafluoropropoxymethyl)aniline. To this solution were added 8.24 gm (0.046 mol) of hippuric acid, 36.75 gm (0.36 mol) of acetic anhydride, and then 6.33 gm (0.08 mol) of pyridine at 20° C. The cyclization-coupling reaction was carried out at 10°–32° C. for 5 hours in the same manner as in Example 8 to obtain 18.59 gm of the target compound with a purity of 96.10%. The yield corrected for purity was 96.70%.

Example 22

An acidic solution containing a diazonium salt was prepared in the same manner as in Example 8 from 11.59 gm (0.04 mol) of 4-chloro-3-(2,2,3,3,3-pentafluoropropoxymethyl)aniline. To this solution were added 8.24 gm (0.046 mol) of hippuric acid, 36.75 gm (0.36 mol) of acetic anhydride, and then 2.24 gm (0.04 mol) of calcium oxide pulverized to the size of beans at 20° C. The cyclization-coupling reaction was carried out at 5°–32° C. for 5 hours in the same manner as in Example 8 to obtain 18.82 gm of the target compound with a purity of 98.70%. The yield corrected for purity was 97.70%.

The relations of neutralization agents, the cyclization-coupling reaction conditions, and the yield in Examples 1–22 Comparative Examples 1–3 are summarized in the following Table 13.

TABLE 13

| | Aniline Derivative | | Hippuric Acid Derivative | | Acetic Anhydride | | Neutralization Agent | | | Hydrazone Yield (%) | Hydrazonation Reaction | |
|---|---|---|---|---|---|---|---|---|---|---|---|---|
| | gm | mol | gm | mol | gm | mol | Compound Name | gm | mol | | Time (Hrs) | Temperature (°C.) |
| Example | | | | | | | | | | | | |
| 1 | 2661 | 9.19 | 17.29 | 9.65 | 8656 | 84.79 | Sodium acetate | 1578 | 19.24 | 85.0 | 16 | <10–30 |
| 2 | 29 | 0.1 | 18.8 | 0.105 | 93.05 | 0.911 | Sodium acetate | 15.09 | 0.184 | 89.8 | 15 | <10–30 |
| 3 | 29 | 0.1 | 18.8 | 0.105 | 93.05 | 0.911 | Sodium acetate | 13.80 | 0.168 | 87.9 | 16 | <10–30 |
| 4 | 29 | 0.1 | 18.8 | 0.105 | 93.05 | 0.911 | Sodium acetate | 15.09 | 0.184 | 87.6 | 16 | <10–25 |
| 5 | 29 | 0.1 | 18.8 | 0.105 | 93.05 | 0.911 | Sodium acetate | 15.09 | 0.184 | 86.6 | 16 | <10–35 |
| 6 | 9.3 | 0.1 | 18.8 | 0.105 | 93.05 | 0.911 | Sodium acetate | 15.09 | 0.184 | 70.2 | 16 | <5–25 |
| 7 | 10.7 | 0.1 | 18.8 | 0.105 | 93.05 | 0.911 | Sodium acetate | 15.09 | 0.184 | 68.9 | 16 | <5–25 |
| Comparative Example | | | | | | | | | | | | |
| 1 | 29 | 0.1 | 23.3 | 0.13 | 93.05 | 0.911 | Sodium acetate | 13.80 | 0.168 | 89.1 | 4 + 12 | −5–20 |
| 2 | 29 | 0.1 | 23.3 | 0.13 | 93.05 | 0.911 | Sodium acetate | 17.20 | 0.210 | 44.9 | 4 + 14 | <5–20 |
| 3 | 818 | 2.82 | 657 | 3.66 | 2618 | 25.65 | Sodium acetate | 485 | 5.912 | 75.0 | 4 + 12 | <5–20 |
| Example | | | | | | | | | | | | |
| 8 | 20.00 | 0.0690 | 14.22 | 0.0794 | 42.28 | 0.414 | Calcium oxide | 3.88 | 0.0690 | 98.2 | 4 | 20–30 |
| 9 | 10.00 | 0.0345 | 7.11 | 0.0397 | 21.14 | 0.207 | Calcium oxide | 1.94 | 0.0345 | 96.1 | 8 | 10–30 |
| 10 | 10.00 | 0.0345 | 7.11 | 0.0397 | 21.14 | 0.207 | Calcium oxide | 1.94 | 0.0345 | 88.1 | 2 | 10–30 |
| 11 | 10.00 | 0.0345 | 7.11 | 0.0397 | 21.14 | 0.207 | Calcium oxide | 1.94 | 0.0345 | 87.1 | 8 | 15–30 |
| 12 | 10.00 | 0.0345 | 7.11 | 0.0397 | 21.14 | 0.207 | Calcium oxide | 1.94 | 0.0345 | 78.8 | 8.5 | 15–30 |
| 13 | 10.00 | 0.0345 | 7.11 | 0.0397 | 21.14 | 0.207 | Calcium oxide | 1.07 | 0.0190 | 98.2 | 4 | 20–30 |
| 14 | 10.00 | 0.0345 | 7.11 | 0.0397 | 21.14 | 0.207 | Barium oxide | 5.29 | 0.0345 | 80.1 | 4 | 20–30 |
| 15 | 10.00 | 0.0345 | 7.11 | 0.0397 | 21.14 | 0.207 | Zinc oxide | 2.81 | 0.0345 | 89.9 | 4 | 20–30 |
| 16 | 10.00 | 0.0345 | 7.11 | 0.0397 | 21.14 | 0.207 | Magnesium oxide | 1.39 | 0.0345 | 97.5 | 4 | 20–30 |
| 17 | 10.00 | 0.0345 | 7.11 | 0.0397 | 21.14 | 0.207 | Barium carbonate | 6.81 | 0.0345 | 86.7 | 4 | 20–30 |
| 18 | 10.00 | 0.0345 | 7.11 | 0.0397 | 21.14 | 0.207 | Calcium carbonate | 3.45 | 0.0345 | 97.7 | 4 | 20–30 |
| 19 | 10.00 | 0.0345 | 7.11 | 0.0397 | 21.14 | 0.207 | Calcium acetate | 5.46 | 0.0345 | 98.0 | 4 | 20–30 |
| 20 | 11.59 | 0.04 | 8.24 | 0.046 | 36.75 | 0.36 | Triethylamine | 8.10 | 0.08 | 82.6 | 5 | 15–35 |
| 21 | 11.59 | 0.04 | 8.24 | 0.046 | 36.75 | 0.36 | Pyridine | 6.33 | 0.08 | 96.7 | 5 | 10–32 |
| 22 | 11.59 | 0.04 | 8.24 | 0.046 | 36.75 | 0.36 | Calcium oxide | 2.24 | 0.04 | 97.7 | 5 | 5–32 |

As indicated in the process scheme of the present invention and as illustrated above, the process of the present invention does not require a separate, independent step for the preparation of a solution of the hippuric acid derivative and acetic anhydride. This ensures elimination of the complicated rapid heating and quenching procedures required in this step in the mass production of 2-phenyl-4,5-oxazoledione 4-phenylhydrazone derivatives. Furthermore, the process of the present invention ensures a significant reduction in the surplus amount of hippuric acid derivatives to be used as required in conventional processes in order to avoid the decrease in the yield of the target compound due to decomposition of oxazolone derivatives which are cyclized in hot acetic anhydride. Thus, the process was successful in manufacturing 2-phenyl-4,5-oxazoledione 4-phenylhydrazone derivatives in a high yield in a short period of time.

Obviously, numerous modification and variations of the present invention are possible in light of the above teachings. It is therefore to be understood that the scope of the appended claims, the invention may be practiced otherwise than as specifically described herein.

What is claimed is:

1. A process for producing a 2-phenyl-4,5-oxazoledione-4-phenylhydrazone compound of Formula (III):

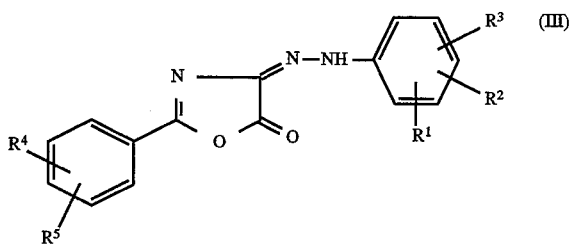

wherein:

$R^1$ is Cl, F, I, ($C_1$–$C_3$) alkyl, $CF_3$ or $NO_2$;
$R^2$ is H, Cl, or $CH_3$;
$R^3$ is H or $CH_3$; and
$R^4$ and $R^5$ are H's, which comprises contacting a mixture comprising:

(a) acetic anhydride;
(b) a hippuric acid of Formula (II):

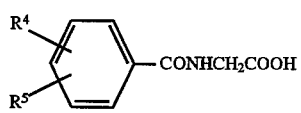

wherein $R^4$ and $R^5$ are the same as defined above (c) a water-containing acidic solution of a benzenediazonium salt of Formula (I):

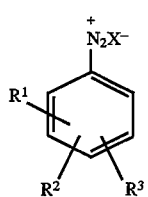

wherein $R^1$, $R^2$ and $R^3$ are the same as defined above and X is an anion; and (d) a neutralizing agent: without contacting well a substantially water-free mixture comprising acetic anhydride and said hippuric acid, at a temperature and for a length of time suitable for cyclocondensation of from said hippuric acid to the corresponding 2-(substituted or unsubstituted)phenyl-5-(4H)-oxazolone.

2. A process for producing a 2-phenyl-4,5-oxazoledione-4-phenylhydrazone compound of Formula (III):

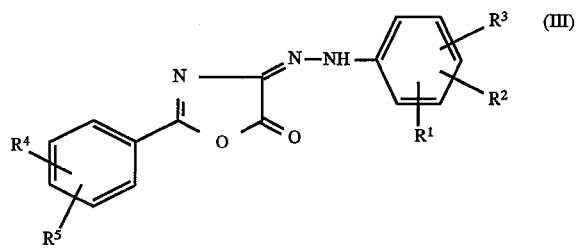

wherein:

$R^1$ is H, halogen, ($C_1$–$C_2$) alkyl, $CF_3$, 3,3,3-trifluoropropyl, $OCH_3$, CN, $CH_2OCH_3$, $SCH_3$, methoxycarbonyl or i-propoxycarbonyl;
$R^2$ is H, halogen, ($C_1$–$C_2$)alkyl; and,
$R^3$, $R^4$ and $R^5$ are H's, which comprises contacting a mixture comprising:

(a) acetic anhydride;
(b) a hippuric acid of Formula (II):

wherein $R^4$ and $R^5$ are the same as defined above (c) a water-containing acidic solution of a benzenediazonium salt of Formula (I):

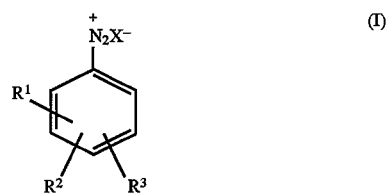

wherein $R^1$, $R^2$ and $R^3$ are the same as defined above and X is an anion; and (d) a neutralizing agent: without contacting well a substantially water-free mixture comprising acetic anhydride and said hippuric acid, at a temperature and for a length of time suitable for cyclocondensation of from hippuric acid to the corresponding 2-(substituted or unsubstituted)phenyl-5-(4H)-oxazolone.

3. A process for producing a 2-phenyl-4,5-oxazoledione-4-phenylhydrazone compound of Formula (III):

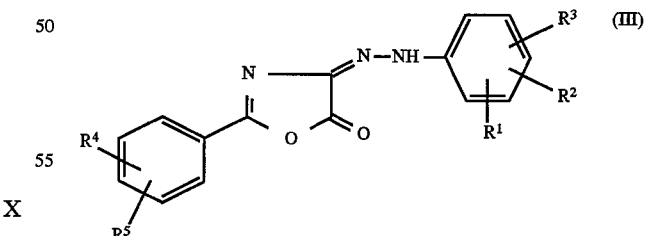

wherein $R^1$ is $AOCH_2$;

A is H, ($C_2$–$C_{10}$) alkyl, fluoro(s) substituted ($C_2$–$C_8$) alkyl, 2-propenyl, ($C_1$–$C_6$) alkoxyethyl, (2-propenoxy) ethyl, [(n-butoxy) ethoxy]ethyl;

($C_3$, $C_5$ or $C_6$)cycloalkylmethyl;

phenyl optionally substituted by Cl F(s), $OCH_3$ or $CH_3$;

benzyl optionally substituted by Cl, F(s), $CH_3$ or $OCH_3$;

phenyloxyethyl wherein the phenyl is optionally substituted by Cl or methyl and benzyloxyethyl;

R², R³, R⁴ and R⁵ are H's;

which comprises contacting a mixture comprising:
(a) acetic anhydride;
(b) a hippuric acid of Formula (II):

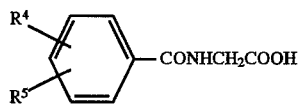

wherein R⁴ and R⁵ are the same as defined above;
(c) a water-containing acidic solution of a benzenediazonium salt of Formula (I):

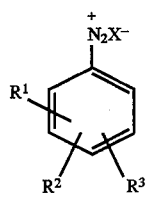

wherein R¹, R² and R³ are the same as defined above and X is an anion; and
(d) a neutralizing agent: without contacting well a substantially water-free mixture comprising acetic anhydride and said hippuric acid, at a temperature and for a length of time suitable for cyclocondensation of from said hippuric acid to the corresponding 2-(substituted or unsubstituted)phenyl-5-(4H)-oxazolone.

4. A process for producing a 2-phenyl-4,5-oxazoledione-4-phenylhydrazone compound of Formula (III):

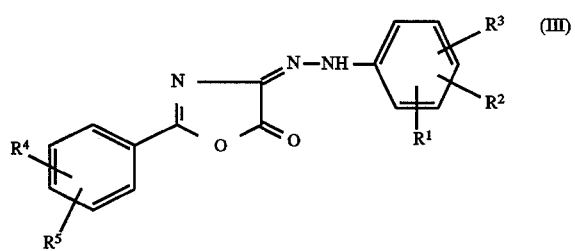

wherein
R¹ is AOCH₂;
A is (C₂–C₆) alkyl, cyclohexylmethyl;
phenyl optionally substituted by Cl, F;
benzyl;
2-propenyl;
fluoro(s) substituted (C₂–C₇) alkyl;
R⁴ is F, Cl, CH₃ or OCH₃; and
R², R³ and R⁵ are H's, which comprises contacting a mixture comprising:
(a) acetic anhydride;
(b) a hippuric acid of Formula (II):

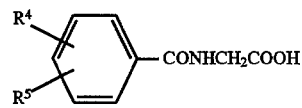

wherein R⁴ and R⁵ are the same as defined above; and
(c) a water-containing acidic solution of a benzenediazonium salt of Formula (I):

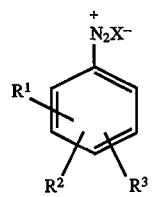

wherein R¹, R₂ and R³ are the same as defined above and X is an anion; and
(d) a neutralizing agent: without contacting well a substantially water-free mixture comprising acetic anhydride and said hippuric acid, at a temperature and for a length of time suitable for cyclocondensation of from said hippuric acid to the corresponding 2-(substituted or unsubstituted)phenyl-5-(4H)-oxazolone.

5. A process for producing a 2-phenyl-4,5-oxazoledione-4-phenylhydrazone compound of Formula (III):

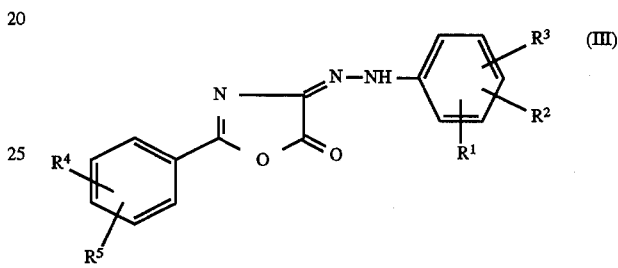

wherein:
R¹ is AOCH₂;
A is (C₂–C₈) alkyl, fluoro(s) substituted (C₂–C₄) alkyl, cyclohexylmethyl, phenyl or benzyl;
R² is F, Cl, Br or (C₁–C₂) alkyl;
R³ is H, F or Cl;
R⁴ is H or F; and
F⁵ is H or F,
which comprises contacting a mixture comprising:
(a) acetic anhydride;
(b) a hippuric acid of Formula (II):

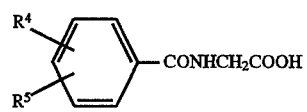

wherein R⁴ and R⁵ are the same as defined above; and
(c) a water-containing acidic solution of a benzenediazonium salt of Formula (I):

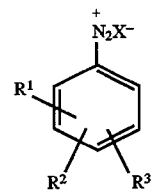

wherein R¹, R² and R³ are the same as defined above and X is an anion, and
(d) a neutralizing agent: without contacting well a substantially water-free mixture comprising acetic anhydride and said hippuric acid, at a temperature and for a length of time suitable for cyclocondensation of from said hippuric acid to the corresponding 2-(substituted or unsubstituted)phenyl-5-(4H)-oxazolone.

6. A process for producing a 2-phenyl-4-,5-oxazoledione-4-phenylhydrazone compound of Formula (III):

(III)

wherein:
R$^1$ is H or F;
R$^4$ is A'OCH$_2$;
A' is fluoro(s) substituted(C$_3$ or C$_4$)alkyl; and
R$^2$, R$^3$ and R$^5$ are H's, which comprises contacting a mixture comprising:
(a) acetic anhydride;
(b) a hippuric acid of Formula (II):

(II)

wherein R$^4$ and R$^5$ are the same as defined above
(c) a water-containing acidic solution of a benezenediazonium salt of Formula (I):

(I)

wherein R$^1$, R$^2$ and R$^3$ are the same as defined above and X is an anion; and
(d) a neutralizing agent:
without contacting well a substantially water-free mixture comprising acetic anhydride and said hippuric acid, at a temperature and for a length of time suitable for cyclocondensation of from said hippuric acid to the corresponding 2-(substituted or unsubstituted)phenyl-5-(4H)-oxazolone.

7. A process for producing a 2-phenyl-4,5-oxazoledione-4-phenylhydrazone compound of Formula (III):

(III)

wherein:
R$^1$ is hydrogen;
C$_1$–C$_3$ alkyl, Cl, I, F, trifluoroalkyl, nitro, cyano, methoxy, methoxymethyl, methoxythio, methoxycarbonyl, isopropoxycarbonyl, and AOCH$_2$, wherein A is H, (C$_2$–C$_{10}$) alkyl, C$_2$–C$_3$ alkyl substituted with one or more F, 2-propenyl, C$_1$–C$_6$ alkoxyethyl, (2-propenoxy) ethyl, n-butoxy ethoxy ethyl, C$_3$, C$_5$ or C$_6$ cycloalkylmethyl, phenyl or benzyl optionally substituted by Cl, one or more F, methyl or methoxy, phenyloxyethyl or phenyloxyethyl wherein the phenyl is substituted by Cl or methyl and benzyloxyethyl;
R$^2$ is H, (C$_1$–C$_2$) alkyl and halo;
R$^3$ is H, methyl and halo;
R$^4$ is H, methyl, methoxy, halo and A'OCH$_2$ wherein A' is a fluoro-substituted C$_3$ or C$_4$;
R$^5$ is H or F;
which comprises contacting a mixture comprising:
(a) acetic anhydride;
(b) a hippuric acid of Formula (II):

(II)

wherein R$^4$ and R$^5$ are the same as defined above
(c) a water-containing acidic solution of a benzenediazonium salt of Formula (I):

(I)

wherein R$^1$ R$^2$ and R$^3$ are the same as defined above and X is an anion; and
(d) a neutralizing agent:
without contacting well a substantially water-free mixture comprising acetic anhydride and said hippuric acid, at a temperature and for a length of time suitable for cyclocondensation of from said hippuric acid to the corresponding 2-(substituted or unsubstituted)phenyl-5-(4H)-oxazolone.

8. A process according to claim 1 wherein said neutralizing agent is selected from the group consisting of alkali metal acetates, alkali earth metal acetates, zinc acetate, alkali metal carboxylates, alkali earth metal carboxylates, zinc carboxylate, barium carbonate, calcium carbonate, alkali earth metal oxides, zinc oxide, triethylamine, ethyldiisopropylamine, tripropylamine, pyridine, methylpyridine; and used in at least a stoichiometric amount of said benzenediazonium salt.

9. A process according to claim 2 wherein said neutralizing agent is selected from the group consisting of alkali metal acetates, alkali earth metal acetates, zinc acetate, alkali metal acetates, alkali earth metal acetates carboxylates, zinc carboxylate, barium carbonate, calcium carbonate, alkali earth metal oxides, zinc oxide, triethylamine, ethyldiisopropylamine, tripropylamine, pyridine, methylpyridine; and used in at least a stoichiometric amount of said benzenediazonium salt.

10. A process according to claim 3 wherein said neutralizing agent is selected from the group consisting of alkali metal acetates, alkali earth metal acetates, zinc acetate, alkali metal acetates, alkali earth metal acetates carboxylates, zinc carboxylate, barium carbonate, calcium carbonate, alkali earth metal oxides, zinc oxide, triethylamine, ethyldiisopropylamine, tripropylamine, pyridine, methylpyridine; and is used in at least a stoichiometric amount of said benzenediazonium salt.

11. A process according to claim 4 wherein said neutralizing agent is selected from the group consisting of alkali metal acetates, alkali earth metal acetates, zinc acetate, alkali metal acetates, alkali earth metal acetates carboxylates, zinc carboxylate, barium carbonate, calcium carbonate, alkali earth metal oxides, zinc oxide, triethylamine, ethyldiisopropylamine, tripropylamine, pyridine, methylpyridine; and is used in at least a stoichiometric amount of said benzenediazonium salt.

12. A process according to claim 5 wherein said neutralizing agent is selected from the group consisting of alkali metal acetates, alkali earth metal acetates, zinc acetate, alkali metal acetates, alkali earth metal acetates carboxylates, zinc carboxylate, barium carbonate, calcium carbonate, alkali earth metal oxides, zinc oxide, triethylamine, ethyldiisopropylamine, tripropylamine, pyridine, methylpyridine; and is used in at least a stoichiometric amount of said benzenediazonium salt.

13. A process according to claim 6 wherein said neutralizing agent is selected from the group consisting of alkali metal acetates, alkali earth metal acetates, zinc acetate, alkali metal acetates, alkali earth metal acetates carboxylates, zinc carboxylate, barium carbonate, calcium carbonate, alkali earth metal oxides, zinc oxide, triethylamine, ethyldiisopropylamine, tripropylamine, pyridine, methylpyridine; and is used in at least a stoichiometric amount of said benzenediazonium salt.

* * * * *

UNITED STATES PATENT AND TRADEMARK OFFICE
CERTIFICATE OF CORRECTION

PATENT NO. : 5,646,291
DATED : July 8, 1997
INVENTOR(S) : Hoshi, et. al.

It is certified that error appears in the above-identified patent and that said Letters Patent is hereby corrected as shown below:

Columns 9-10; lines 22-25 and lines 58-62 and column 12, lines 50-55 that portion of the formula reading:

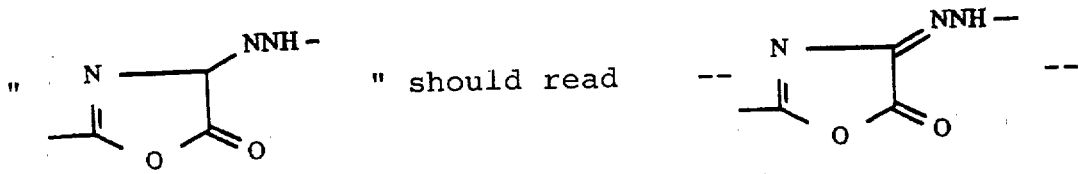

Column 34, line 38: "$F^5$" should read --$R^5$--.

Column 35, line 67; "$C_2-C_3$" should read --$C_2-C_8$--.

Signed and Sealed this

Thirteenth Day of January, 1998

Attest:

BRUCE LEHMAN

Attesting Officer

Commissioner of Patents and Trademarks